United States Patent

Kinoshita et al.

[11] Patent Number: 4,737,430
[45] Date of Patent: Apr. 12, 1988

[54] ELECTROPHOTOGRAPHIC PHOTORECEPTOR WITH AZO-CONTAINING PHOTOSENSITIVE MEMBER

[75] Inventors: Akira Kinoshita; Naohiro Hirose; Kiyoshi Sawada, all of Hino, Japan

[73] Assignee: Konishiroku Photo Industry Co., Ltd., Tokyo, Japan

[21] Appl. No.: 767,960

[22] Filed: Aug. 21, 1985

[30] Foreign Application Priority Data

Aug. 28, 1984 [JP]  Japan .................. 59-179580

[51] Int. Cl.$^4$ .................................. G03G 5/06
[52] U.S. Cl. .......................... 430/59; 430/72; 430/74; 430/75; 430/79; 534/558; 534/563
[58] Field of Search ............ 430/59, 58, 72, 74, 430/75, 76, 77, 78, 79; 534/558, 563

[56] References Cited

U.S. PATENT DOCUMENTS

| | | | |
|---|---|---|---|
| 4,390,611 | 6/1983 | Ishikawa et al. | 430/76 |
| 4,426,432 | 1/1984 | Sawada et al. | 430/73 |
| 4,477,550 | 10/1984 | Horie et al. | 430/77 |
| 4,554,231 | 11/1985 | Ishikawa et al. | 430/77 |
| 4,594,304 | 6/1986 | Watarai et al. | 430/76 |

Primary Examiner—John L. Goodrow
Attorney, Agent, or Firm—Jordan B. Bierman

[57] ABSTRACT

An electrophotographic photosensitive member having a photesensitive layer containing an azo compound represented by the following Formula [I], Formula [I]

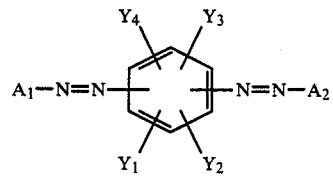

wherein $Y_1$, $Y_2$, $Y_3$ and $Y_4$ each is a hydrogen atom, an alkyl group, an alkoxy group or a halogen atom; $A_1$ and $A_2$ each represents

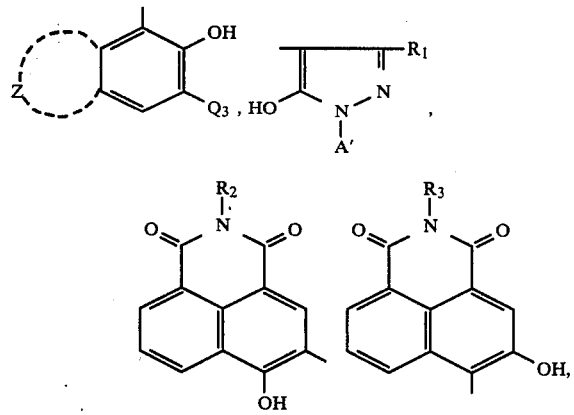

wherein Z is a group of atoms necessary to complete a substituted or unsubstituted aromatic carbocyclic ring of a substituted or unsubstituted aromatic heterocyclic ring; $Q_3$ is substituted or unsubstituted carbamoyl group or a substituted or unsubstituted sulfamoyl group; $R_1$ is a hydrogen atom, a substituted or unsubstituted alkyl group, a substituted or unsubstituted amino group, a substituted or unsubstituted carbamoyl group, a carboxyl group, a carboxyl group or ester group thereof, or a cyano group; A' is a substituted or unsubstituted aryl group; and $R_2$ and $R_3$ each is a substituted or unsubstituted alkyl group, a substituted or unsubstituted aralkyl group, or a substituted or unsubstituted aryl group.

20 Claims, 1 Drawing Sheet

ELECTROPHOTOGRAPHIC PHOTORECEPTOR WITH AZO-CONTAINING PHOTOSENSITIVE MEMBER

BACKGROUND OF THE INVENTION

The present invention relates to a photoreceptor, and more particularly to a novel photoreceptor having a photosensitive layer comprising a specific azo compound.

Those which have hitherto been widely used as the photoreceptor in the electrophotographic process are inorganic photoreceptors having a photosensitive layer comprised principally of an inorganic photoconductive compound such as selenium, zinc oxide, cadmium sulfide, silicon, or the like. These, however, are not necessarily satisfactory in the sensitivity, thermal stability, moisture resistance, durability, and the like. For example, selenium is difficult of manufacture because, when crystallized, its characteristics as of a photoreceptor becomes deteriorated. And it tends to be crystallized due to the heat or finger marks, whereby its property as of the photoreceptor becomes deteriorated. Cadmium sulfide also is problematic in the moisture resistance as well as in the durability. And so is zinc oxide in the durability.

For the purpose of overcoming such disadvantages of these inorganic photoreceptors, the research and development of organic photoreceptors having a photosensitive layer comprised principally of any of various organic photoconductive compounds have become extensively carried on in recent years. For example, Japanese Patent Examined Publication No. 10496/1975 describes an organic photoreceptor having a photosensitive layer containing both poly-N-vinylcarbazole and 2,4,7-trinitro-9-fluorenone. This photoreceptor, however, is not necessarily satisfactory in the sensitivity as well as in the durability. In order to get rid of such shortcomings, attempts have been made to allot the carrier-generating function and carrier-transport function to different materials to thereby develop a higher performance-having organic photoreceptor. Such a function-separated-type photoreceptor permits a wide selection of appropriate materials for the respective functions thereof, and by using them any discretional characteristic-having photoreceptors can be relatively easily produced. Thus, much research has been carried out for the development of photoreceptors of this type.

In the above-mentioned function-separated-type photoreceptors, as the carrier-generating material thereof a variety of compounds have been proposed. An example of those inorganic compounds usable as the carrier-generating material is the amorphous selenium described in, e.g., Japanese Patent Examined Publication No. 16198/1968. This is to be used in combination with an organic photoconductive compound, but the carrier-generating layer comprised of the amorphous selenium is still not improved to get rid of the disadvantage that the layer is crystallized by heat to cause its characteristic to be deteriorated.

Also, there have been many proposals for electrophotographic photoreceptors which use organic dyes or pigments as the carrier-generating material. For example, those electrophotographic photoreceptors which contain bisazo compounds in the photosensitive layer thereof are already of the prior art found in Japanese Patent Publication Open to Public Inspection (hereinafter referred to as Japanese Patent O.P.I. Publication) Nos. 22834/1979, 73057/1980, 117151/1980 and 46237/1981. These bisazo compounds, however, are not necessarily satisfactory in the sensitivity, residual potential or stability against the repetitional use, and limits the selectable range of carrier-transport materials, and thus are unable to adequately satisfy diverse requirements in the electrophotographic process.

Further, in recent years, as the light source for the photoreceptor, gas lasers as Ar laser, He-Ne laser, etc., and semiconductor lasers have begun to be used. These lasers are characterized by permitting their time-series ON/OFF operation, and are promising as the light source for those image-processing function-having copiers including intelligent copiers or for those output printers used for computers. Among other things, semiconductor lasers attract attention for the reason that their nature requires no electric signal/light signal conversion elements such as acoustic elements, and they enable making their devices to be of a smaller size and a lighter weight. However, not only is the semiconductor laser's output lower than that of the gas laser but also its oscillating wavelength is on the longer wavelength side (not less than about 780 nm), and in contrast, the spectral sensitivity of conventional photoreceptors is on the far shorter wavelength side than that of the semiconductor laser. Accordingly, conventional photoreceptors can not be used as the photoreceptor for which the semiconductor laser is used as the light source.

It is therefore an object of the present invention to provide a photoreceptor comprising a specific azo compound which is excellent in the carrier-generating function.

It is another object of the present invention to provide a photoreceptor which is so excellently durable that it has a high sensitivity and small residual potential and, even when used repeatedly, these characteristics are unchangeably stable.

It is a further object of the present invention to provide a photoreceptor comprising an azo compound which, even when used in combination with any of diverse carrier-transport materials, is capable of acting effectively as a carrier-generating material.

It is still another object of the present invention to provide a photoreceptor which has an adequately substantial sensitivity even when used to a longer-wavelength light source such as a semiconductor laser.

A still further object of the present invention will become apparent from the description in this specification.

DETAILED DESCRIPTION OF THE INVENTION

Figure 1:
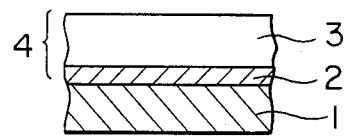
FIGS. 1 through 6 are cross-sectional views showing examples of the mechanical construction of the photoreceptor of the present invention.
Figure 2:
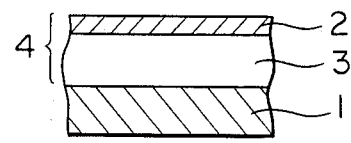

As a result of our continued investigation to accomplish the above objects, we have now found that any one of those azo compounds having the following formula [I] is capable of acting as an effective constituent of the photoreceptor, and thus, we have completed this invention.

Formula [I]

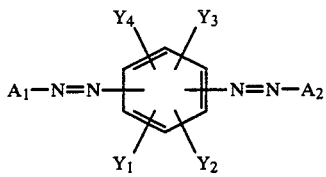

wherein $Y_1$, $Y_2$, $Y_3$ and $Y_4$ each is a hydrogen atom, an alkyl group, an alkoxy group or a halogen atom; $A_1$ and $A_2$ each is

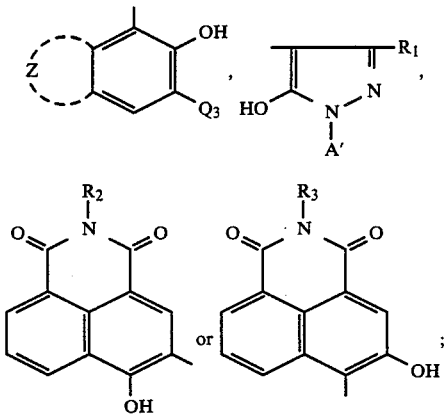

and $Q_3$ is a substituted or unsubstituted carbamoyl group

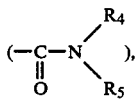

a substituted or unsubstituted sulfamoyl group

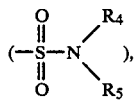

wherein $R_4$ is a substituted or unsubstituted alkyl group having from 1 to 4 carbon atoms, a substituted or unsubstituted aralkyl group or a substituted or unsubstituted phenyl group; and $R_5$ is a hydrogen atom, a substituted or unsubstituted alkyl group having from 1 to 4 carbon atoms, a substituted or unsubstituted aromatic carbocyclic group (such as a substituted or unsubstituted phenyl group, a substituted or unsubstituted anthryl group, etc.), or a substituted or unsubstituted aromatic heterocyclic group (such as a substituted or unsubstituted carbazolyl group, a substituted or unsubstituted dibenzofuryl group, etc.).

Those substituents to these groups include, e.g., alkyl groups (such as methyl, ethyl, isopropyl, tertiary butyl, trifluoromethyl, etc.), substituted or unsubstituted aralkyl groups (such as benzyl, phenethyl, etc.), halogen atoms (chlorine, bromine, fluorine, iodine), substituted or unsubstituted alkoxy groups having from 1 to 4 carbon atoms (such as methoxy, ethoxy, isopropoxy, tertiary butoxy, 2-chloroethoxy, etc.), hydroxy group, substituted or unsubstituted aryloxy groups (such as p-chlorophenoxy, 1-napthoxy, etc.), aryloxy groups (such as acetyloxy, p-cyanobenzoyloxy, etc.), carboxy group and esters thereof (such as ethoxycarbonyl, m-bromophenoxycarbonyl, etc.), substituted or unsubstituted carbamoyl groups (such as aminocarbonyl, tertiary butylaminocarbonyl, anilinocarbonyl), acyl groups (such as acetyl, o-nitrobenzoyl), sulfo group, substituted or unsubstituted sulfamoyl groups (such as aminosulfonyl, tertiary butylaminosulfonyl, p-tolylaminosulfonyl), amino group, acylamino groups (such as acetylamino, benzoylamino, etc.), sulfonamido groups (such as methanesulfonamido, p-toluenesulfonamido, etc.), cyano group, nitro group, and the like. The preferred substituents among these are substituted or unsubstituted alkyl groups having from 1 to 4 carbon atoms (such as methyl, ethyl, isopropyl, n-butyl, trifluoromethyl, etc.), halogen atoms (chlorine, bromine, fluorine, iodine), substituted or unsubstituted alkoxy groups having from 1 to 4 carbon atoms (such as methoxy, ethoxy, tertiary butoxy, 2-chloroethoxy, etc.), cyano group and nitro group.

Z is a group of atoms necessary to form a substituted or unsubstituted aromatic carbocyclic ring or a substituted or unsubstituted aromatic heterocyclic ring, and concretely it represents a group of atoms for the formation of, e.g., a substituted or unsubstituted benzene ring, a substituted or unsubstituted naphthalene ring, a substituted or unsubstituted indole ring, or a substituted or unsubstituted carbazole ring.

Those substituents to these rings include, e.g., a series of the substituents enumerated as those of $R_4$ and $R_5$, and preferably halogen atoms (chlorine, bromine, fluorine, iodine), sulfo group, and sulfamoyl groups (such as aminosulfonyl, p-tolylaminosulfonyl, etc.).

$R_1$ is a hydrogen atom, a substituted or unsubstituted alkyl group, a substituted or unsubstituted amino group, a carboxyl group or ester thereof, a substituted or unsubstituted carbamoyl group, or a cyano group, and preferably a hydrogen atom, a substituted or unsubstituted alkyl group having from 1 to 4 carbon atoms (such as methyl, ethyl, isopropyl, tertiary butyl, trifluoromethyl, etc.), or a cyano group.

A' is a substituted or unsubstituted aryl group, and preferably a substituted or unsubstituted phenyl group. Those substituents to these groups include, e.g., a series of the substituents enumerated as those of $R_4$ and $R_5$, and preferably halogen atoms (chlorine, bromine, fluorine, iodine), substituted or unsubstituted alkyl groups having from 1 to 4 carbon atoms (such as methyl, ethyl, isopropyl, tertiary butyl, trifluoromethyl, etc.), and substituted or unsubstituted alkoxy groups having from 1 to 4 carbon atoms (such as methoxy, ethoxy, isopropoxy, tertiary butoxy, 2-chloroethoxy).

$R_2$ and $R_3$ each is a substituted or unsubstituted alkyl group, a substituted or unsubstituted aralkyl group, or substituted or unsubstituted aryl group, and preferably a substituted or unsubstituted alkyl group having from 1 to 4 carbon atoms (such as methyl, ethyl, isopropyl, tertiary butyl, trifluoromethyl, etc.) or a substituted or unsubstituted phenyl group (such as phenyl, p-methoxyphenyl, m-chlorophenyl, etc.).

Examples of the useful azo compounds having Formula [I] in this invention include those having, e.g., the following structural formulas, but the azo compounds of this invention are not limited to and by the examples.

Exemplified Compounds

Formula [II]

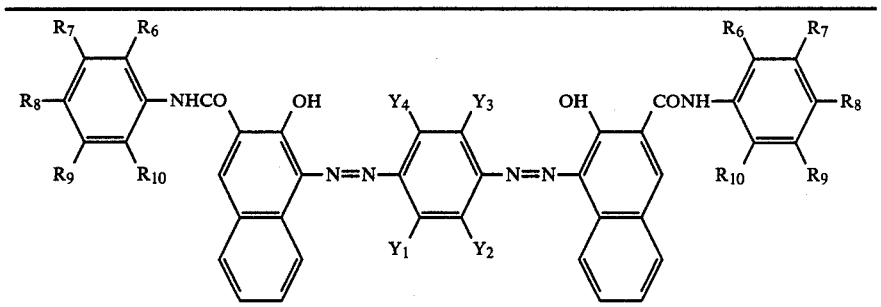

| Compound No. | $Y_4$ | $Y_3$ | $Y_2$ | $Y_1$ | $R_6$ | $R_7$ | $R_8$ | $R_9$ | $R_{10}$ |
|---|---|---|---|---|---|---|---|---|---|
| A-1 | H | H | H | H | H | H | H | H | H |
| A-2 | H | H | H | H | $CH_3$ | H | H | H | H |
| A-3 | H | H | H | H | $CH_3$ | H | $CH_3$ | H | H |
| A-4 | H | H | H | H | $C_2H_5$ | H | H | H | H |
| A-5 | H | H | H | H | H | H | $OCH_3$ | H | H |
| A-6 | H | H | H | H | H | $OCH_3$ | $OCH_3$ | H | H |
| A-7 | H | H | H | H | $CH_3$ | H | $OCH_3$ | H | H |
| A-8 | H | H | H | H | Cl | H | H | H | H |
| A-9 | H | H | H | H | Br | H | H | H | H |
| A-10 | H | H | H | H | F | H | H | H | H |
| A-11 | H | H | H | H | Cl | Cl | H | H | H |
| A-12 | H | H | H | H | Cl | H | Cl | H | H |
| A-13 | H | H | H | H | H | Cl | Cl | H | H |
| A-14 | H | H | H | H | Cl | H | Cl | H | H |
| A-15 | H | H | H | H | H | Cl | H | Cl | H |
| A-16 | H | H | H | H | H | $CH_3$ | H | H | H |
| A-17 | H | H | H | H | H | H | $CH_3$ | H | H |
| A-18 | H | H | H | H | H | H | $CH_3$ | $CH_3$ | H |
| A-19 | H | H | H | H | H | $CH_3$ | H | $CH_3$ | H |
| A-20 | H | H | H | H | H | $C_2H_5$ | H | H | H |
| A-21 | H | H | H | H | H | H | $C_2H_5$ | H | H |
| A-22 | H | H | H | H | H | H | F | H | H |
| A-23 | H | H | H | H | H | F | H | H | H |
| A-24 | H | H | H | H | H | H | Br | H | H |
| A-25 | H | H | H | H | H | $OCH_3$ | $OCH_3$ | $OCH_3$ | H |
| A-26 | H | H | H | H | $OCH_3$ | H | H | H | H |
| A-27 | H | H | H | H | H | H | $C_8H_{17}$ | H | H |
| A-28 | H | H | H | H | H | H | $COCH_3$ | H | H |
| A-29 | H | H | H | H | H | OH | H | H | H |
| A-30 | H | H | H | H | H | $NO_2$ | H | H | H |
| A-31 | H | H | H | H | $C_4H_9$ | H | H | H | H |
| A-32 | H | H | H | H | H | H | $C_4H_9$ | H | H |
| A-33 | H | H | H | H | H | H | $C_3H_7$ | H | H |
| A-34 | H | H | H | H | H | H | I | H | H |
| A-35 | $CH_3$ | H | H | H | H | H | H | H | H |
| A-36 | $CH_3$ | H | H | H | $CH_3$ | H | H | H | H |
| A-37 | $CH_3$ | H | H | H | H | $CH_3$ | H | H | H |
| A-38 | $CH_3$ | H | H | H | H | H | $CH_3$ | H | H |
| A-39 | $CH_3$ | H | H | H | H | H | H | $CH_3$ | H |
| A-40 | $CH_3$ | H | H | H | H | $CH_3$ | H | $CH_3$ | H |
| A-41 | $CH_3$ | H | H | H | $CH_3$ | H | $CH_3$ | H | H |
| A-42 | $CH_3$ | H | H | H | $CH_3$ | H | $OCH_3$ | H | H |
| A-43 | $CH_3$ | H | H | H | H | H | $OCH_3$ | H | H |
| A-44 | $CH_3$ | H | H | H | $C_2H_5$ | H | H | H | H |
| A-45 | $CH_3$ | H | H | H | $C_2H_5$ | H | $C_2H_5$ | H | H |
| A-46 | $OCH_3$ | H | H | H | H | H | H | H | H |
| A-47 | $OCH_3$ | H | H | H | H | H | Cl | H | H |
| A-48 | $OCH_3$ | H | H | H | $CH_3$ | H | H | H | H |

Formula [III]

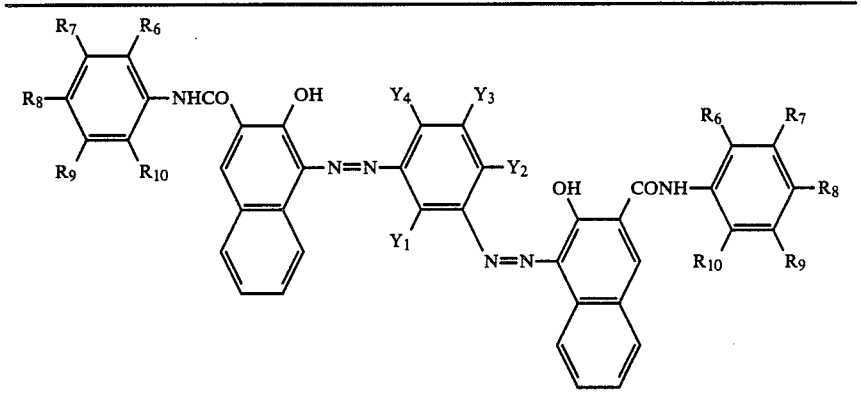

| Compound No. | Y4 | Y3 | Y2 | Y1 | R6 | R7 | R8 | R9 | R10 |
|---|---|---|---|---|---|---|---|---|---|
| A-49 | H | H | H | H | H | H | H | H | H |
| A-50 | H | H | H | H | $CH_3$ | H | H | H | H |
| A-51 | H | H | H | H | $CH_3$ | H | $CH_3$ | H | H |
| A-52 | H | H | H | H | $C_2H_5$ | H | H | H | H |
| A-53 | H | H | H | H | H | H | $OCH_3$ | H | H |
| A-54 | H | H | H | H | H | $OCH_3$ | $OCH_3$ | H | H |
| A-55 | H | H | H | H | $CH_3$ | H | $OCH_3$ | H | H |
| A-56 | H | H | H | H | Cl | H | H | H | H |
| A-57 | H | H | H | H | Br | H | H | H | H |
| A-58 | H | H | H | H | F | H | H | H | H |
| A-59 | H | H | H | H | Cl | Cl | H | H | H |
| A-60 | H | H | H | H | Cl | H | Cl | H | H |
| A-61 | H | H | H | H | H | Cl | Cl | H | H |
| A-62 | H | H | H | H | Cl | H | Cl | H | H |
| A-63 | H | H | H | H | H | Cl | H | Cl | H |
| A-64 | H | H | H | H | H | $CH_3$ | H | H | H |
| A-65 | H | H | H | H | H | H | $CH_3$ | H | H |
| A-66 | H | H | H | H | H | H | $CH_3$ | $CH_3$ | H |
| A-67 | H | H | H | H | H | $CH_3$ | H | $CH_3$ | H |
| A-68 | H | H | H | H | H | $C_2H_5$ | H | H | H |
| A-69 | H | H | H | H | H | H | $C_2H_5$ | H | H |
| A-70 | H | H | H | H | H | H | F | H | H |
| A-71 | H | H | H | H | H | F | H | H | H |
| A-72 | H | H | H | H | H | H | Br | H | H |
| A-73 | H | H | H | H | H | $OCH_3$ | $OCH_3$ | $OCH_3$ | H |
| A-74 | H | H | H | H | $OCH_3$ | H | H | H | H |
| A-75 | H | H | H | H | H | H | $C_8H_{17}$ | H | H |
| A-76 | H | H | H | H | H | H | $OCH_3$ | H | H |
| A-77 | H | H | H | H | H | OH | H | H | H |
| A-78 | H | H | H | H | H | $NO_2$ | H | H | H |
| A-79 | H | H | H | H | $C_4H_9$ | H | H | H | H |
| A-80 | H | H | H | H | H | H | $C_4H_9$ | H | H |
| A-81 | H | H | H | H | H | H | $C_3H_7$ | H | H |
| A-82 | H | H | H | H | H | H | I | H | H |
| A-83 | $CH_3$ | H | H | H | H | H | H | H | H |
| A-84 | $CH_3$ | H | H | H | $CH_3$ | H | H | H | H |
| A-85 | $CH_3$ | H | H | H | H | $CH_3$ | H | H | H |
| A-86 | $CH_3$ | H | H | H | H | H | $CH_3$ | H | H |
| A-87 | $CH_3$ | H | H | H | H | H | H | $CH_3$ | H |
| A-88 | $CH_3$ | H | H | H | H | $CH_3$ | H | $CH_3$ | H |
| A-89 | $CH_3$ | H | H | H | $CH_3$ | H | $CH_3$ | H | H |
| A-90 | $CH_3$ | H | H | H | $CH_3$ | H | $OCH_3$ | H | H |
| A-91 | $CH_3$ | H | H | H | H | H | $OCH_3$ | H | H |
| A-92 | $CH_3$ | H | H | H | $C_2H_5$ | H | H | H | H |
| A-93 | $CH_3$ | H | H | H | $C_2H_5$ | H | $C_2H_5$ | H | H |
| A-94 | $OCH_3$ | H | H | H | H | H | H | H | H |
| A-95 | $OCH_3$ | H | H | H | H | H | Cl | H | H |
| A-96 | $OCH_3$ | H | H | H | $CH_3$ | H | H | H | H |

Formula [IV]

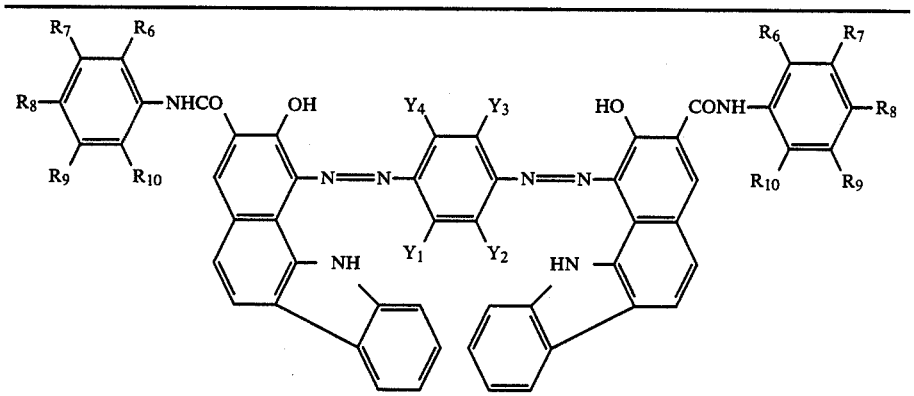

| Compound No. | $Y_4$ | $Y_3$ | $Y_2$ | $Y_1$ | $R_6$ | $R_7$ | $R_8$ | $R_9$ | $R_{10}$ |
|---|---|---|---|---|---|---|---|---|---|
| A-97 | H | H | H | H | H | H | H | H | H |
| A-98 | H | H | H | H | $CH_3$ | H | H | H | H |
| A-99 | H | H | H | H | $CH_3$ | H | $CH_3$ | H | H |
| A-100 | H | H | H | H | $C_2H_5$ | H | H | H | H |
| A-101 | H | H | H | H | H | H | $OCH_3$ | H | H |
| A-102 | H | H | H | H | H | $OCH_3$ | $OCH_3$ | H | H |
| A-103 | H | H | H | H | $CH_3$ | H | $OCH_3$ | H | H |
| A-104 | H | H | H | H | Cl | H | H | H | H |
| A-105 | H | H | H | H | Br | H | H | H | H |
| A-106 | H | H | H | H | F | H | H | H | H |
| A-107 | H | H | H | H | Cl | Cl | H | H | H |
| A-108 | H | H | H | H | Cl | H | Cl | H | H |
| A-109 | H | H | H | H | H | Cl | Cl | H | H |
| A-110 | H | H | H | H | Cl | H | Cl | H | H |
| A-111 | H | H | H | H | H | Cl | H | Cl | H |
| A-112 | H | H | H | H | H | $CH_3$ | H | H | H |
| A-113 | H | H | H | H | H | H | $CH_3$ | H | H |
| A-114 | H | H | H | H | H | H | $CH_3$ | $CH_3$ | H |
| A-115 | H | H | H | H | H | $CH_3$ | H | $CH_3$ | H |
| A-116 | H | H | H | H | H | $C_2H_5$ | H | H | H |
| A-117 | H | H | H | H | H | H | $C_2H_5$ | H | H |
| A-118 | H | H | H | H | H | H | F | H | H |
| A-119 | H | H | H | H | H | F | H | H | H |
| A-120 | H | H | H | H | H | H | Br | H | H |
| A-121 | H | H | H | H | H | $OCH_3$ | $OCH_3$ | $OCH_3$ | H |
| A-122 | H | H | H | H | $OCH_3$ | H | H | H | H |
| A-123 | H | H | H | H | H | H | $C_8H_{17}$ | H | H |
| A-124 | H | H | H | H | H | H | $OCH_3$ | H | H |
| A-125 | H | H | H | H | H | OH | H | H | H |
| A-126 | H | H | H | H | H | $NO_2$ | H | H | H |
| A-127 | H | H | H | H | $C_4H_9$ | H | H | H | H |
| A-128 | H | H | H | H | H | H | $C_4H_9$ | H | H |
| A-129 | H | H | H | H | H | H | $C_3H_7$ | H | H |
| A-130 | H | H | H | H | H | H | I | H | H |
| A-131 | $CH_3$ | H | H | H | H | H | H | H | H |
| A-132 | $CH_3$ | H | H | H | $CH_3$ | H | H | H | H |
| A-133 | $CH_3$ | H | H | H | H | $CH_3$ | H | H | H |
| A-134 | $CH_3$ | H | H | H | H | H | $CH_3$ | H | H |
| A-135 | $CH_3$ | H | H | H | H | H | H | $CH_3$ | H |
| A-136 | $CH_3$ | H | H | H | H | $CH_3$ | H | $CH_3$ | H |
| A-137 | $CH_3$ | H | H | H | $CH_3$ | H | $CH_3$ | H | H |
| A-138 | $CH_3$ | H | H | H | $CH_3$ | H | $OCH_3$ | H | H |
| A-139 | $CH_3$ | H | H | H | H | H | $OCH_3$ | H | H |
| A-140 | $CH_3$ | H | H | H | $C_2H_5$ | H | H | H | H |
| A-141 | $CH_3$ | H | H | H | $C_2H_5$ | H | $C_2H_5$ | H | H |
| A-142 | $OCH_3$ | H | H | H | H | H | H | H | H |
| A-143 | $OCH_3$ | H | H | H | H | H | Cl | H | H |
| A-144 | $OCH_3$ | H | H | H | $CH_3$ | H | H | H | H |

Formula [V]

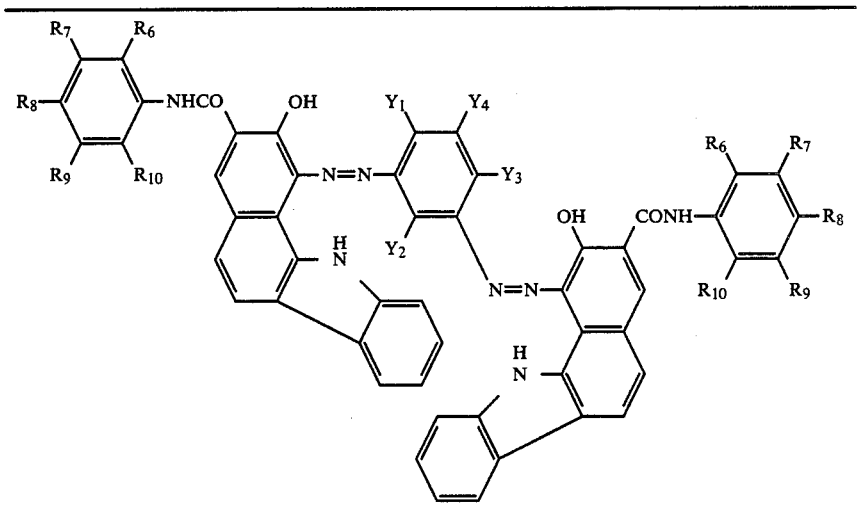

| Compound No. | Y4 | Y3 | Y2 | Y1 | R6 | R7 | R8 | R9 | R10 |
|---|---|---|---|---|---|---|---|---|---|
| A-145 | H | H | H | H | H | H | H | H | H |
| A-146 | H | H | H | H | CH3 | H | H | H | H |
| A-147 | H | H | H | H | CH3 | H | CH3 | H | H |
| A-148 | H | H | H | H | C2H5 | H | H | H | H |
| A-149 | H | H | H | H | H | H | OCH3 | H | H |
| A-150 | H | H | H | H | H | OCH3 | OCH3 | H | H |
| A-151 | H | H | H | H | CH3 | H | OCH3 | H | H |
| A-152 | H | H | H | H | Cl | H | H | H | H |
| A-153 | H | H | H | H | Br | H | H | H | H |
| A-154 | H | H | H | H | F | H | H | H | H |
| A-155 | H | H | H | H | Cl | Cl | H | H | H |
| A-156 | H | H | H | H | Cl | H | Cl | H | H |
| A-157 | H | H | H | H | H | Cl | Cl | H | H |
| A-158 | H | H | H | H | Cl | H | H | H | H |
| A-159 | H | H | H | H | H | Cl | H | Cl | H |
| A-160 | H | H | H | H | H | CH3 | H | H | H |
| A-161 | H | H | H | H | H | H | CH3 | H | H |
| A-162 | H | H | H | H | H | H | CH3 | CH3 | H |
| A-163 | H | H | H | H | H | Cl | H | CH3 | H |
| A-164 | H | H | H | H | H | C2H5 | H | H | H |
| A-165 | H | H | H | H | H | H | C2H5 | H | H |
| A-166 | H | H | H | H | H | H | F | H | H |
| A-167 | H | H | H | H | H | F | H | H | H |
| A-168 | H | H | H | H | H | H | Br | H | H |
| A-169 | H | H | H | H | H | OCH3 | OCH3 | OCH3 | H |
| A-170 | H | H | H | H | OCH3 | H | H | H | H |
| A-171 | H | H | H | H | H | H | C8H17 | H | H |
| A-172 | H | H | H | H | H | H | OCH3 | H | H |
| A-173 | H | H | H | H | H | OH | H | H | H |
| A-174 | H | H | H | H | H | NO2 | H | H | H |
| A-175 | H | H | H | H | C4H9 | H | H | H | H |
| A-176 | H | H | H | H | H | H | C4H9 | H | H |
| A-177 | H | H | H | H | H | H | C3H7 | H | H |
| A-178 | H | H | H | H | H | H | I | H | H |
| A-179 | CH3 | H | H | H | H | H | H | H | H |
| A-180 | CH3 | H | H | H | CH3 | H | H | H | H |
| A-181 | CH3 | H | H | H | H | CH3 | H | H | H |
| A-182 | CH3 | H | H | H | H | H | CH3 | H | H |
| A-183 | CH3 | H | H | H | H | H | H | CH3 | H |
| A-184 | CH3 | H | H | H | H | CH3 | H | CH3 | H |
| A-185 | CH3 | H | H | H | CH3 | H | CH3 | H | H |
| A-186 | CH3 | H | H | H | CH3 | H | OCH3 | H | H |
| A-187 | CH3 | H | H | H | H | H | OCH3 | H | H |
| A-188 | CH3 | H | H | H | C2H5 | H | H | H | H |
| A-189 | CH3 | H | H | H | C2H5 | H | C2H5 | H | H |
| A-190 | OCH3 | H | H | H | H | H | H | H | H |
| A-191 | OCH3 | H | H | H | H | H | Cl | H | H |
| A-192 | OCH3 | H | H | H | CH3 | H | H | H | H |

Formula [VI]

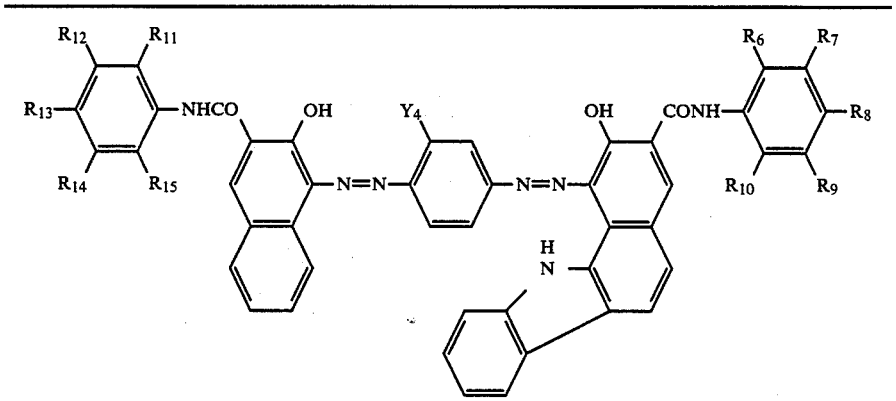

| Compound No. | Y₄ | R₆ | R₇ | R₈ | R₉ | R₁₀ | R₁₁ | R₁₂ | R₁₃ | R₁₄ | R₁₅ |
|---|---|---|---|---|---|---|---|---|---|---|---|
| A-193 | H | H | H | H | H | H | H | H | H | H | H |
| A-194 | H | CH₃ | H | H | H | H | H | H | H | H | H |
| A-195 | H | CH₃ | H | H | H | H | CH₃ | H | H | H | H |
| A-196 | H | CH₃ | H | CH₃ | H | H | CH₃ | H | CH₃ | H | H |
| A-197 | H | H | H | H | H | H | CH₃ | H | H | H | H |
| A-198 | H | H | H | OCH₃ | H | H | H | H | H | H | H |
| A-199 | H | H | H | OCH₃ | H | H | H | H | OCH₃ | H | H |
| A-200 | H | H | H | H | H | H | H | H | OCH₃ | H | H |
| A-201 | H | H | H | CH₃ | H | H | H | H | CH₃ | H | H |
| A-202 | H | CH₃ | H | OCH₃ | H | H | H | H | H | H | H |
| A-203 | H | CH₃ | H | OCH₃ | H | H | CH₃ | H | OCH₃ | H | H |
| A-204 | H | H | H | H | H | H | Cl | H | H | H | H |
| A-205 | H | H | H | H | H | H | H | H | Cl | H | H |
| A-206 | H | H | H | Cl | H | H | H | H | Cl | H | H |
| A-207 | H | H | H | H | H | H | H | H | Br | H | H |
| A-208 | H | H | H | Br | H | H | H | H | H | H | H |
| A-209 | H | H | H | Br | H | H | H | H | Br | H | H |
| A-210 | H | H | H | H | H | H | Br | H | H | H | H |
| A-211 | H | C₂H₅ | H | H | H | H | H | H | H | H | H |
| A-212 | H | C₂H₅ | H | H | H | H | C₂H₅ | H | H | H | H |
| A-213 | H | C₂H₅ | H | H | H | H | Cl | H | H | H | H |
| A-214 | H | C₂H₅ | H | H | H | H | CH₃ | H | H | H | H |
| A-215 | H | H | H | OCH₃ | H | H | H | H | Cl | H | H |
| A-216 | H | H | H | OCH₃ | H | H | H | H | Br | H | H |
| A-217 | H | H | H | OCH₃ | H | H | CH₃ | H | CH₃ | H | H |
| A-218 | H | H | H | OCH₃ | H | H | H | H | C₂H₅ | H | H |
| A-219 | H | CH₃ | H | OCH₃ | H | H | Cl | H | H | H | H |
| A-220 | H | CH₃ | H | OCH₃ | H | H | H | H | Cl | H | H |
| A-221 | H | CH₃ | H | OCH₃ | H | H | H | H | Br | H | H |
| A-222 | H | CH₃ | H | OCH₃ | H | H | H | CH₃ | H | H | H |
| A-223 | H | CH₃ | H | OCH₃ | H | H | H | OCH₃ | H | H | H |
| A-224 | H | CH₃ | H | OCH₃ | H | H | H | H | C₂H₅ | H | H |
| A-225 | H | CH₃ | H | OCH₃ | H | H | H | H | C₄H₉ | H | H |
| A-226 | H | H | H | OCH₃ | H | H | Cl | H | H | H | H |
| A-227 | H | H | H | OCH₃ | H | H | Br | H | H | H | H |
| A-228 | CH₃ | H | H | H | H | H | H | H | H | H | H |

Formula [VII]

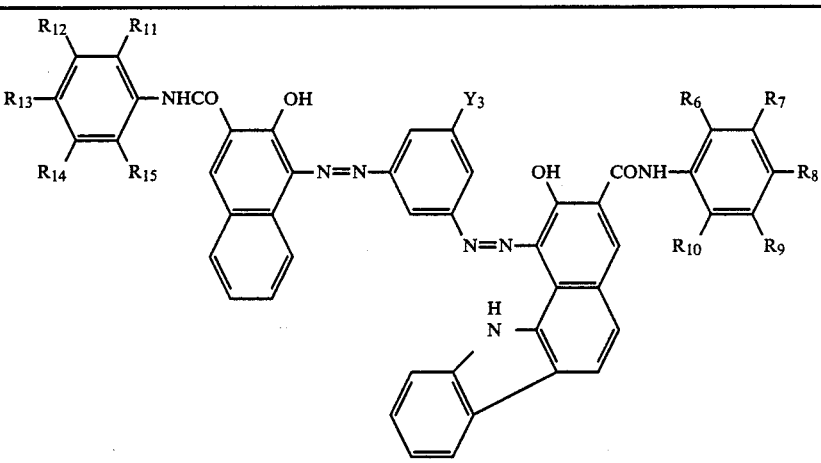

| Compound No. | Y₃ | R₆ | R₇ | R₈ | R₉ | R₁₀ | R₁₁ | R₁₂ | R₁₃ | R₁₄ | R₁₅ |
|---|---|---|---|---|---|---|---|---|---|---|---|
| A-229 | H | H | H | H | H | H | H | H | H | H | H |
| A-230 | H | CH₃ | H | H | H | H | H | H | H | H | H |
| A-231 | H | CH₃ | H | H | H | H | CH₃ | H | H | H | H |
| A-232 | H | CH₃ | H | CH₃ | H | H | CH₃ | H | CH₃ | H | H |
| A-233 | H | H | H | H | H | H | CH₃ | H | H | H | H |
| A-234 | H | H | H | OCH₃ | H | H | H | H | H | H | H |
| A-235 | H | H | H | OCH₃ | H | H | H | H | OCH₃ | H | H |
| A-236 | H | H | H | H | H | H | H | H | OCH₃ | H | H |
| A-237 | H | H | H | CH₃ | H | H | H | H | CH₃ | H | H |
| A-238 | H | CH₃ | H | OCH₃ | H | H | H | H | H | H | H |
| A-239 | H | CH₃ | H | OCH₃ | H | H | CH₃ | H | OCH₃ | H | H |
| A-240 | H | H | H | H | H | H | Cl | H | H | H | H |
| A-241 | H | H | H | H | H | H | H | H | Cl | H | H |
| A-242 | H | H | H | Cl | H | H | H | H | Cl | H | H |
| A-243 | H | H | H | H | H | H | H | H | Br | H | H |
| A-244 | H | H | H | Br | H | H | H | H | H | H | H |
| A-245 | H | H | H | Br | H | H | H | H | Br | H | H |
| A-246 | H | H | H | H | H | H | Br | H | H | H | H |
| A-247 | H | C₂H₅ | H | H | H | H | H | H | H | H | H |
| A-248 | H | C₂H₅ | H | H | H | H | C₂H₅ | H | H | H | H |
| A-249 | H | C₂H₅ | H | H | H | H | Cl | H | H | H | H |
| A-250 | H | C₂H₅ | H | H | H | H | CH₃ | H | H | H | H |
| A-251 | H | H | H | OCH₃ | H | H | H | H | Cl | H | H |
| A-252 | H | H | H | OCH₃ | H | H | H | H | Br | H | H |
| A-253 | H | H | H | OCH₃ | H | H | CH₃ | H | CH₃ | H | H |
| A-254 | H | H | H | OCH₃ | H | H | H | H | C₂H₅ | H | H |
| A-255 | H | CH₃ | H | OCH₃ | H | H | Cl | H | H | H | H |
| A-256 | H | CH₃ | H | OCH₃ | H | H | H | H | Cl | H | H |
| A-257 | H | CH₃ | H | OCH₃ | H | H | H | H | Br | H | H |
| A-258 | H | CH₃ | H | OCH₃ | H | H | H | CH₃ | H | H | H |
| A-259 | H | CH₃ | H | OCH₃ | H | H | H | OCH₃ | H | H | H |
| A-260 | H | CH₃ | H | OCH₃ | H | H | H | H | C₂H₅ | H | H |
| A-261 | H | CH₃ | H | OCH₃ | H | H | H | H | C₄H₉ | H | H |
| A-262 | H | H | H | OCH₃ | H | H | Cl | H | H | H | H |
| A-263 | H | H | H | OCH₃ | H | H | Br | H | H | H | H |
| A-264 | H | H | H | H | H | H | H | H | H | H | H |
| A-265 | | | | | | | | | | | |

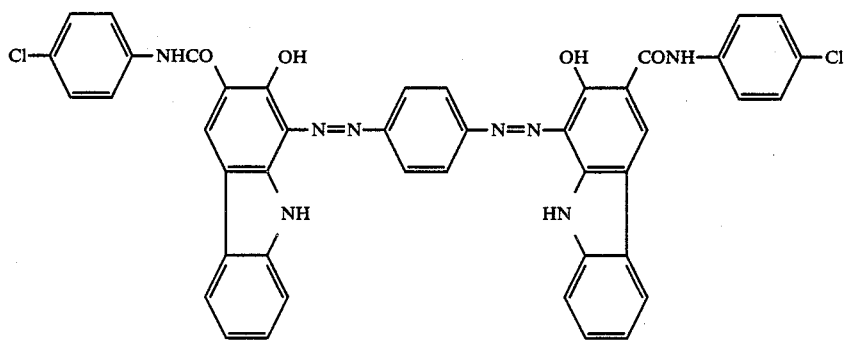

-continued
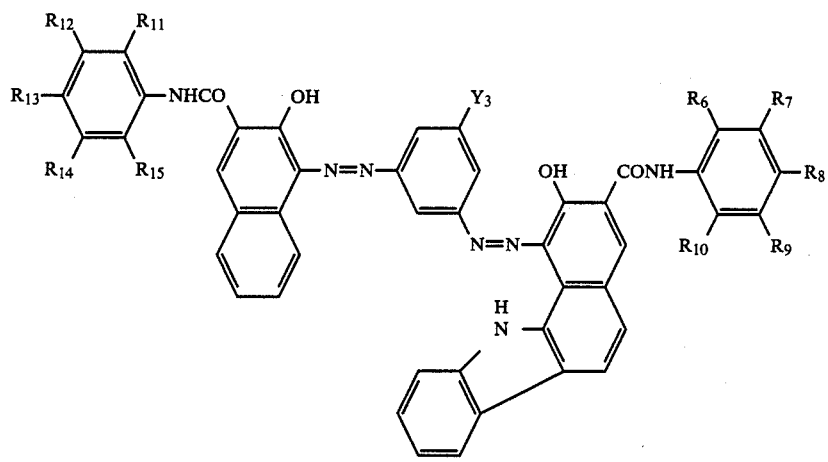
| Compound No. | $Y_3$ | $R_6$ | $R_7$ | $R_8$ | $R_9$ | $R_{10}$ | $R_{11}$ | $R_{12}$ | $R_{13}$ | $R_{14}$ | $R_{15}$ |
|---|---|---|---|---|---|---|---|---|---|---|---|
A-266
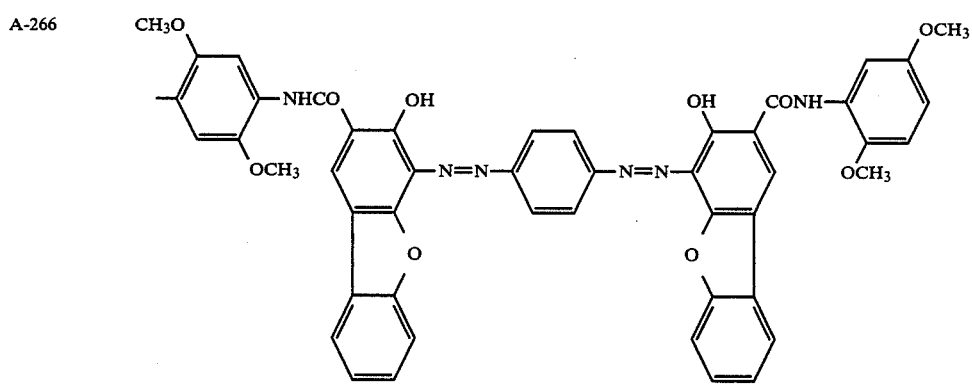
A-267
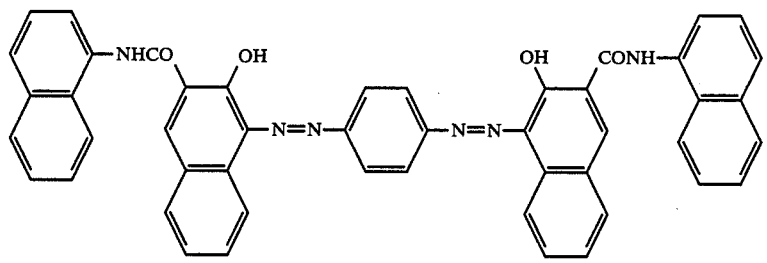
A-268
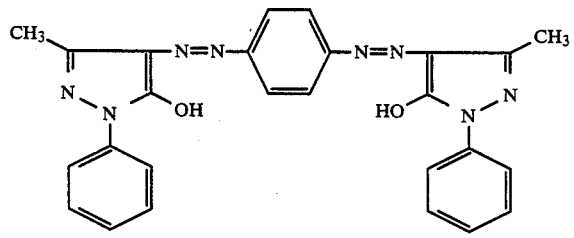

-continued

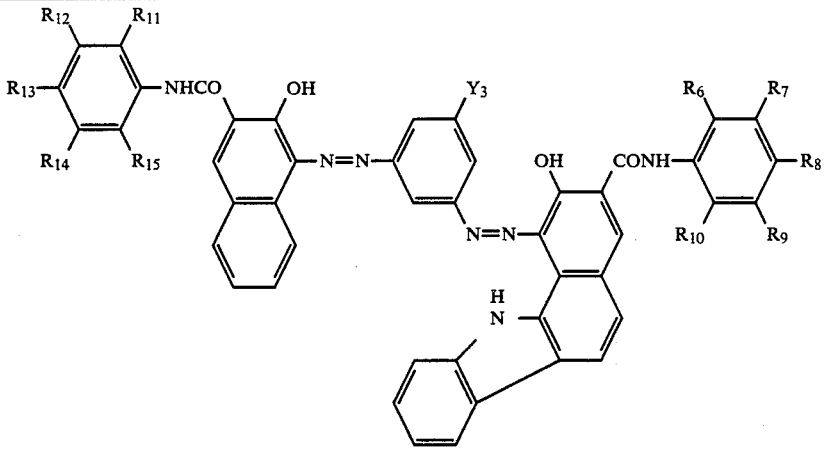

| Compound No. | Y₃ | R₆ | R₇ | R₈ | R₉ | R₁₀ | R₁₁ | R₁₂ | R₁₃ | R₁₄ | R₁₅ |
|---|---|---|---|---|---|---|---|---|---|---|---|

A-269

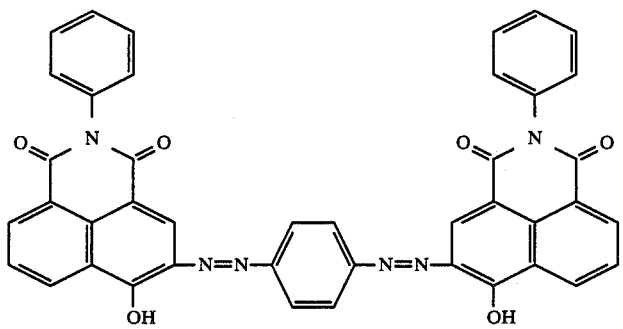

A-270

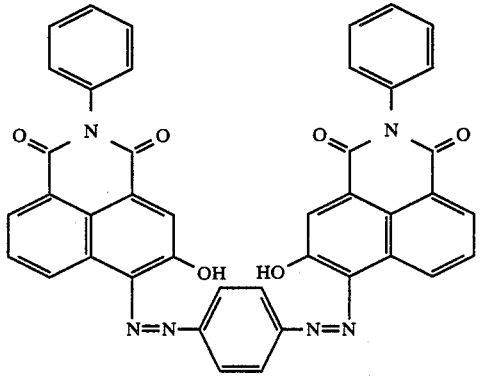

Any of the above-enumerated azo compounds may be easily synthesized in known manners. An example of the synthesis is given below:

(Synthesis of Exemplified Compound A-3)

Twenty milliliters of 47% HBF₄ are put in a 100 ml flask, and to this, with stirring at −5° C., are added dropwise 8 ml of an aqueous solution containing 2.8 g (0.04 mole) of NaNO₂, and at the same time is slowly added a liquid prepared by dispersing 3.6 g (0.02 mole) of p-phenylenediamine hydrochloride into 6 ml of water. After completion of the addition, the reaction liquid is stirred for 15 minutes at the same temperature, and then the deposited crystals are filtered. The obtained tetrazonium salt is dissolved into 400 ml of cold DMF, and the solution is kept at a temperature of not more than 5° C.

On the other hand, a solution of 14.0 g (0.048 mole) of 2',4'-dimethyl-2-hydroxy-3-naphthoic acid anilide dissolved in 700 ml of DMF is cooled and added to the above-prepared tetrazonium salt solution. To this mixture, with stirring, is added dropwise a solution, kept at not more than 5° C., of 10.8 g of CH₃COONa.3H₂O dissolved in 50 ml of water. After the dropping, the liquid is further stirred for two hours at the same temperature, and the resulting deposit is filtered. The filtrated deposit is washed with DMF, with water, and then with methanol, and then dried, whereby 6.78 g (yield 43%) of Exemplified Compound A-3 are obtained.

Any of the foregoing azo compounds of this invention has an excellent photoconductivity. The production of a photoreceptor with use of the compound may be made by providing on a conductive support a photosensitive layer of the azo compound of this invention dispersed in a binder, but particularly excellent results can be obtained in the case where the azo compound of this invention, making the most of its photoconductivity, especially its carrier-generating ability, is used as a carrier-generating material, and also a carrier-transport material which can effectively act in combination therewith is used, thus constructing a so-called function-separated-type photoreceptor. The function-separated-type photoreceptor is allowed to be of the dispersion type, but more desirable to be of the multilayer type comprising a carrier-generating layer containing a carrier-generating material and a carrier-transport layer containing a carrier-transport material.

As for the mechanical construction of a photoreceptor, various forms are known. The photoreceptor of this invention is allowed to take any of the forms.

Figure 3:
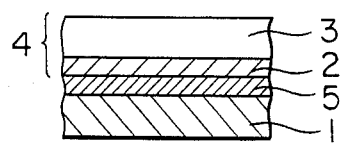

Usually, such forms as shown in FIGS. 1 through 6 are applicable. In FIGS. 1 and 3, on a conductive support 1 is provided a photosensitive layer 4 in the multilayer form comprising a carrier-generating layer 2 consisting principally of the foregoing azo compound and a carrier-transport layer 3 consisting principally of a carrier-transport material.

Figure 4:
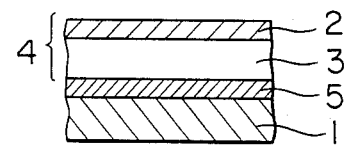
Figure 5:
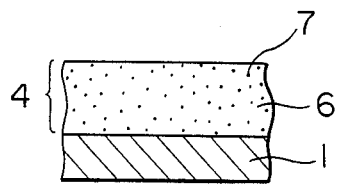
Figure 6:
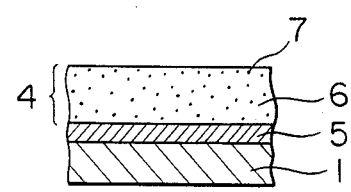

As is indicated in FIGS. 3 and 4, photosensitive layer 4 may also be provided through an interlayer 5 on the conductive support. When photosensitive layer 4 is of the double construction like this, the most excellent electrophotographic characteristic-having photoreceptor can be obtained. Also, in this invention, as is shown in FIGS. 5 and 6, photosensitive layer 4 comprising carrier-generating material 7 dispersed in layer 6 consisting principally of a carrier-transport material may be directly or through interlayer 5 on conductive support 1.

In the case where the azo compound of this invention is used as a carrier-generating material, the carrier-transport material usable in combination with this includes electronacceptors tending to transport electrons such as trinitrofluorenone, tetranitrofluorenone, etc., and electron donative materials tending to transport positive holes such as polymers having in the side chain thereof heterocyclic compounds typified by poly-N-vinylcarbazole, triazole derivatives, oxadiazole derivatives, imidazole derivatives, pyrazoline derivatives, polyarylalcane derivatives, phenylenediamine derivatives, hydrazone derivatives, amino-substituted chalcone derivatives, triarylamine derivatives, carbazole derivatives, stilbene derivatives, phenothiazine derivatives, and the like.

The following are typical examples of the carrier-transport materials useful in this invention, but the carrier-transport materials usable in this invention are not limited to the examples.

Formula [VIII]

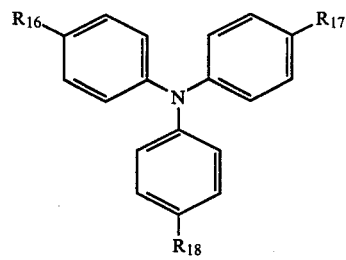

wherein $R_{16}$, $R_{17}$ and $R_{18}$ each is a hydrogen atom, an alkyl group, an alkoxy group, a halogen atom, a hydroxy group, a cyano group, a dialkylamino group, a diarylamino group, a diaralkylamino group, or a nitro group.

Formula [IX]

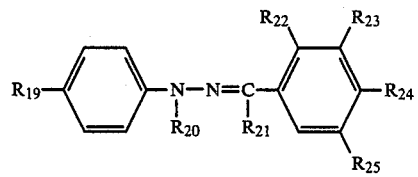

wherein $R_{19}$, $R_{22}$, $R_{23}$, $R_{24}$ and $R_{25}$ each is a hydrogen atom, an alkyl group, an alkoxy group, a halogen atom, a hydroxy group, a cyano group, a dialkylamino group, a diarylamino group, a diaralkylamino group or a nitro group; $R_{20}$ is an alkyl group, a substitutable phenyl group, a substitutable benzyl group, or a substitutable naphthyl group; and $R_{21}$ is a hydrogen atom, an alkyl group, a cyano group or a substitutable phenyl group.

Formula [X]

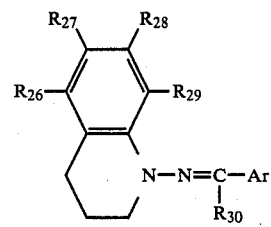

wherein $R_{26}$, $R_{27}$, $R_{28}$ and $R_{29}$ each is a hydrogen atom, an alkyl group, an alkoxy group, a halogen atom, a hydroxy group, a cyano group, a dialkylamino group, a diarylamino group, a diaralkylamino group or a nitro group; R is a hydrogen atom, a substitutable phenyl group, a cyano group or an alkyl group; Ar is

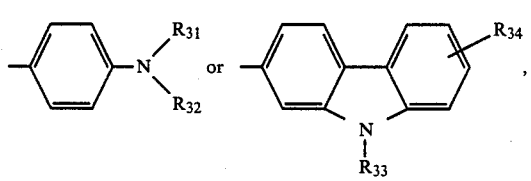

wherein $R_{31}$, $R_{32}$ and $R_{33}$ each is an alkyl group, a substitutable benzyl group, a substitutable phenyl group or a substitutable naphthyl group; and $R_{34}$ is a hydrogen atom, an alkyl group, an alkoxy group, a halogen atom, a hydroxy group, a cyano group, a dialkylamino group, a diarylamino group, diaralkylamino group, or a nitro group.

Formula [XI]

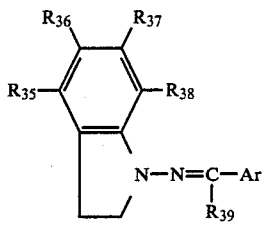

wherein $R_{35}$, $R_{36}$, $R_{37}$ and $R_{38}$ each is a hydrogen atom, an alkyl group, an alkoxy group, a halogen atom, a hydroxy group, a cyano group, a dialkylamino group, a diarylamino group, a diaralkylamino group, or a nitro group; $R_{39}$ is a hydrogen atom, a substitutable phenyl group, a cyano group, or an alkyl group; Ar is

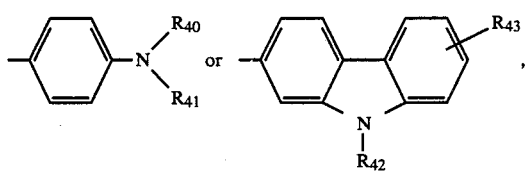

wherein $R_{40}$, $R_{41}$ and $R_{42}$ each is an alkyl group, a substitutable benzyl group, a substitutable phenyl group, or a substitutable naphthyl group; and $R_{43}$ is a hydrogen atom, an alkyl group, an alkoxy group, a halogen atom, a hydroxy group, a cyano group, a dialkylamino group, a diarylamino group, a diaralkylamino group, or a nitro group.

Formula [XII]

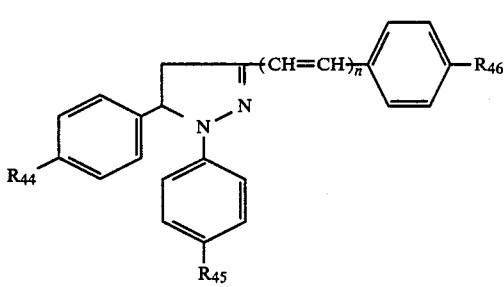

wherein $R_{44}$, $R_{45}$ and $R_{46}$ each is a hydrogen atom, an alkyl group, an alkoxy group, a halogen atom, a hydroxy group, a cyano group, a dialkylamino group, a diarylamino group, a diaralkylamino group, or a nitro group; and n is an integer of zero or 1.

Formula [XIII]

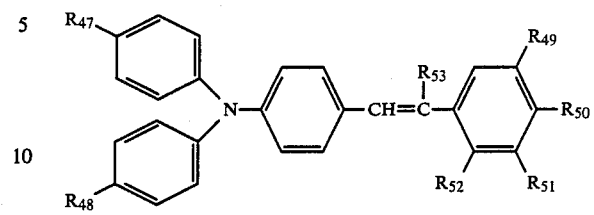

wherein $R_{47}$, $R_{48}$, $R_{49}$, $R_{50}$, $R_{51}$ and $R_{52}$ each is a hydrogen atom, an alkyl group, an alkoxy group, a halogen atom, a hydroxy group, a cyano group, a dialkylamino group, a diarylamino group, a diaralkylamino group, or a nitro group; and $R_7$ is a hydrogen atom or a phenyl group.

Formula [XIV]

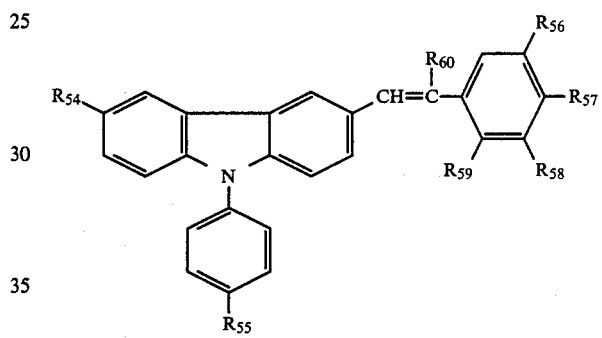

wherein $R_{54}$, $R_{55}$, $R_{56}$, $R_{57}$, $R_{58}$ and $R_{59}$ each is a hydrogen atom, an alkyl group, an alkoxy group, a halogen atom, a hydroxy group, a cyano group, a dialkylamino group, a diarylamino group, a diaralkylamino group, or a nitro group; and $R_{60}$ is a hydrogen atom or a phenyl group.

Formula [XV]

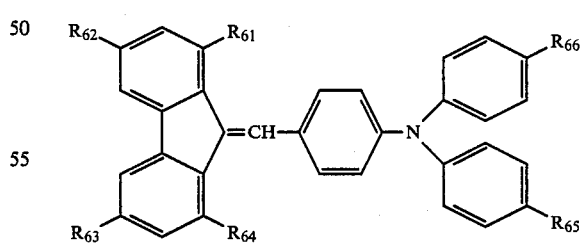

wherein $R_{61}$, $R_{62}$, $R_{63}$, $R_{64}$, $R_{65}$ and $R_{66}$ each is a hydrogen atom, an alkyl group, an alkoxy group, a halogen atom, a hydroxy group, a cyano group, dialkylamino group, diarylamino group, a diaralkylamino group, or a nitro group.

The following are particular examples of the above-described carrier-transport materials:

Those having Formula [VIII]

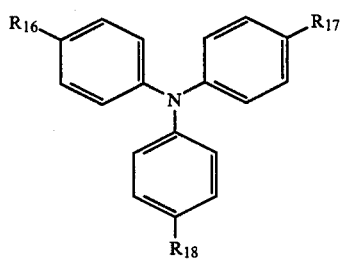

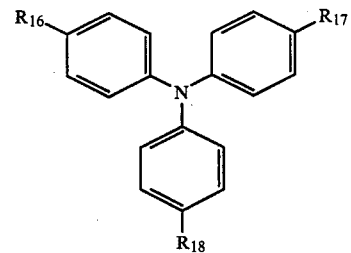

| No. | R₁₆ | R₁₇ | R₁₈ |
|---|---|---|---|
| T-1 | H | H | H |
| T-2 | —CH₃ | H | H |
| T-3 | —CH₃ | —CH₃ | H |
| T-4 | —CH₃ | —C₂H₅ | H |
| T-5 | —CH₃ | —OCH₃ | H |
| T-6 | —CH₃ | —OC₂H₅ | H |
| T-7 | —CH₃ | —N(C₂H₅)₂ | H |
| T-8 | —CH₃ | —N(C₆H₅)₂ | H |
| T-9 | —CH₃ | Cl | H |
| T-10 | —CH₃ | —NO₂ | H |
| T-11 | —CH₃ | —CH₃ | —CH₃ |
| T-12 | —CH₃ | —CH₃ | —OCH₃ |
| T-13 | —CH₃ | —CH₃ | —NO₂ |
| T-14 | —CH₃ | —CH₃ | —N(CH₂C₆H₅)₂ |
| T-15 | —CH₃ | —C₂H₅ | —OCH₃ |
| T-16 | —CH₃ | —N(C₆H₅)₂ | —N(C₆H₅)₂ |
| T-17 | —C₂H₅ | —OC₂H₅ | —OC₂H₅ |
| T-18 | —C₂H₅ | H | H |
| T-19 | —OCH₃ | H | H |
| T-20 | —OC₂H₅ | H | H |
| T-21 | Cl | H | H |
| T-22 | I | H | H |
| T-23 | Br | H | H |
| T-24 | F | H | H |
| T-25 | —NO₂ | H | H |
| T-26 | —N(CH₂C₆H₅)₂ | H | H |
| T-27 | —N(C₂H₅)₂ | H | H |
| T-28 | —N(C₆H₅)₂ | H | H |
| T-29 | —CN | H | H |
| T-30 | —OH | H | H |
| T-31 | —OCH₂C₆H₅ | H | H |
| T-32 | —OCH₃ | —OCH₃ | H |
| T-33 | —OCH₃ | —OCH₃ | —OCH₃ |
| T-34 | —NO₂ | —NO₂ | —NO₂ |
| T-35 | —N(C₆H₅)₂ | —N(C₆H₅)₂ | —N(C₆H₅)₂ |
| T-36 | —N(C₆H₄CH₃)₂ | —CH₃ | —CH₃ |
| T-37 | —N(C₆H₅)(C₆H₄Cl) | —Cl | H |
| T-38 | —N(C₆H₅)₂ | —N(C₆H₅)₂ | —OCH₃ |
| T-39 | —N(CH₂C₆H₅)₂ | H | H |
| T-40 | —N(C₂H₅)₂ | —C₂H₅ | —CH₃ |
| T-41 | —N(C₂H₅)₂ | —OCH₃ | H |

-continued

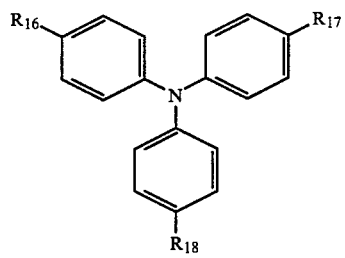

| No. | $R_{16}$ | $R_{17}$ | $R_{18}$ |
|---|---|---|---|
| T-42 | Br | Br | Br |

Those having Formula [IX]

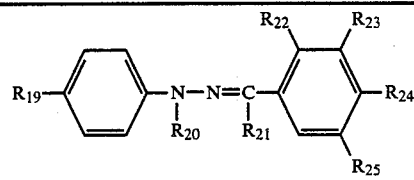

| No. | $R_{19}$ | $R_{20}$ | $R_{21}$ | $R_{22}$ | $R_{23}$ | $R_{24}$ | $R_{25}$ |
|---|---|---|---|---|---|---|---|
| T-43 | H | 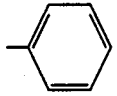 | H | H | H | H | H |
| T-44 | H | 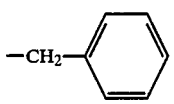 | H | H | H | H | H |
| T-45 | H | $-C_2H_5$ | H | H | H | H | H |
| T-46 | H | $-CH_3$ | H | H | H | H | H |
| T-47 | H | $-CH_3$ | H | H | H | $-CH_3$ | H |
| T-48 | H | $-CH_3$ | H | H | H | $-C_2H_5$ | H |
| T-49 | H | $-CH_3$ | H | H | H | $-OCH_3$ | H |
| T-50 | H | $-CH_3$ | H | H | H | $-OC_2H_5$ | H |
| T-51 | H | $-CH_3$ | H | H | H | 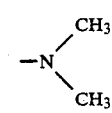 | H |
| T-52 | H | $-CH_3$ | H | H | H | 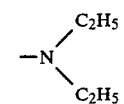 | H |
| T-53 | H | $-CH_3$ | H | H | H | 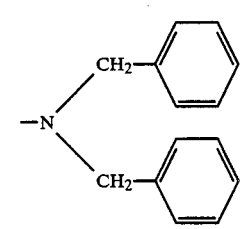 | H |
| T-54 | H | $-CH_3$ | H | $-CH_3$ | H | $-CH_3$ | H |
| T-55 | H | $-CH_3$ | H | Cl | H | $-CH_3$ | H |
| T-56 | H | $-CH_3$ | H | H | $-CH_3$ | $-CH_3$ | H |
| T-57 | H | $-CH_3$ | H | H | $-CH_3$ | H | $-CH_3$ |
| T-58 | H | $-CH_3$ | H | H | $-OCH_3$ | $-OCH_3$ | $-OCH_3$ |
| T-59 | H | $-CH_3$ | H | H | $-OCH_3$ | $-OCH_3$ | H |
| T-60 | H | $-CH_3$ | H | $-OCH_3$ | H | $-OCH_3$ | H |
| T-61 | H | $-CH_3$ | H | H | $-NO_2$ | H | H |
| T-62 | H | $-CH_3$ | H | H | H | $-OH$ | H |
| T-63 | H | 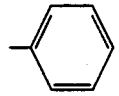 | H | H | H | H | H |

-continued

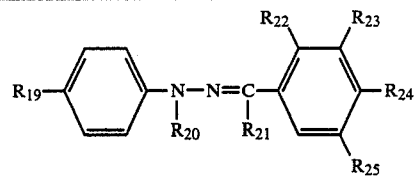

| No. | $R_{19}$ | $R_{20}$ | $R_{21}$ | $R_{22}$ | $R_{23}$ | $R_{24}$ | $R_{25}$ |
|---|---|---|---|---|---|---|---|
| T-64 | —CH$_3$ | —CH$_3$ | H | H | H | —N(C$_2$H$_5$)$_2$ | H |
| T-65 | —C$_2$H$_5$ | —CH$_3$ | H | H | H | —N(CH$_2$C$_6$H$_5$)$_2$ | H |
| T-66 | —OCH$_3$ | —CH$_3$ | H | —CH$_3$ | H | —CH$_3$ | H |
| T-67 | —OC$_2$H$_5$ | —CH$_3$ | H | Cl | H | —CH$_3$ | H |
| T-68 | Cl | —CH$_3$ | H | H | —CH$_3$ | —CH | H |
| T-69 | —N(CH$_3$)$_2$ | —CH$_3$ | H | H | —CH$_3$ | H | —CH$_3$ |
| T-70 | —N(C$_2$H$_5$)$_2$ | —CH$_3$ | H | H | —OCH$_3$ | —OCH$_3$ | —OCH$_3$ |
| T-71 | —NO$_2$ | —CH$_3$ | H | H | —OCH$_3$ | —OCH$_3$ | H |
| T-72 | —OH | —CH$_3$ | H | —OCH | H | —OCH$_3$ | H |
| T-73 | —CH$_3$ | —CH$_3$ | —C$_6$H$_5$ | H | —NO$_2$ | H | H |
| T-74 | —C$_2$H$_5$ | —CH$_3$ | —CN | H | H | —OH | H |
| T-75 | —OCH$_3$ | —CH$_3$ | —CH$_3$ | H | H | H | H |
| T-76 | H | —CH$_2$C$_6$H$_5$ | H | H | H | —N(C$_2$H$_5$)$_2$ | H |
| T-77 | H | —CH$_2$C$_6$H$_5$ | H | H | H | —N(CH$_2$C$_6$H$_5$)$_2$ | H |
| T-78 | H | —CH$_2$C$_6$H$_5$ | H | —CH$_3$ | H | —CH$_3$ | H |

-continued
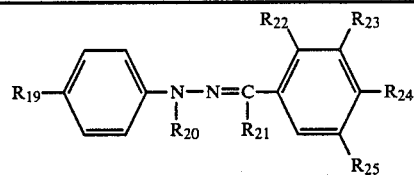
| No. | $R_{19}$ | $R_{20}$ | $R_{21}$ | $R_{22}$ | $R_{23}$ | $R_{24}$ | $R_{25}$ |
|---|---|---|---|---|---|---|---|
| T-79 | H | $-CH_2-C_6H_5$ | H | Cl | H | $-CH_3$ | H |
| T-80 | $-CH$ | $-CH_2-C_6H_5$ | H | H | $-CH_3$ | $-CH_3$ | H |
| T-81 | $-OCH$ | $-CH_2-C_6H_5$ | H | H | $-CH_3$ | H | $-CH_3$ |
| T-82 | Cl | $-CH_2-C_6H_5$ | H | H | $-OCH_3$ | $-OCH_3$ | $-OCH_3$ |
| T-83 | $-N(CH_3)_2$ | $-CH_2-C_6H_5$ | H | H | $-OCH_3$ | $-OCH_3$ | H |
| T-84 | $-NO_2$ | $-CH_2-C_6H_5$ | $-C_6H_5$ | $-OCH_3$ | H | $-OCH_3$ | H |
| T-85 | $-CH_3$ | $-CH_2-C_6H_5$ | $-CN$ | H | $-NO_2$ | H | H |
| T-86 | $-OC_2H_5$ | $-CH_2-C_6H_5$ | $-CH$ | H | H | $-OH$ | H |
| T-87 | Br | $-CH_2-C_6H_5$ | $-C_2H_5$ | H | H | H | H |
| T-88 | H | $-C_6H_5$ | H | H | H | $-N(C_2H_5)_2$ | H |
| T-89 | H | $-C_6H_5$ | H | H | H | $-N(CH_2-C_6H_5)_2$ | H |

-continued
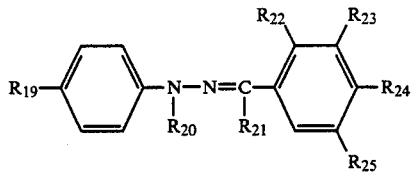
| No. | R19 | R20 | R21 | R22 | R23 | R24 | R25 |
|---|---|---|---|---|---|---|---|
| T-90 | H | phenyl | H | —CH₃ | H | —CH₃ | H |
| T-91 | H | phenyl | phenyl | Cl | H | —CH₃ | H |
| T-92 | —CH | 4-CH₃-phenyl | —CN | H | —CH₃ | —CH₃ | H |
| T-93 | —OCH₃ | 4-OCH-phenyl | H | H | —CH₃ | H | —CH₃ |
| T-94 | Cl | phenyl | —CH₃ | H | —OCH₃ | —OCH₃ | —OCH₃ |
| T-95 | —N(CH₃)₂ | phenyl | —C₂H₅ | H | —OCH₃ | —OCH₃ | H |
| T-96 | —NO₂ | 4-NO₂-phenyl | H | —OCH₃ | H | —OCH₃ | H |
| T-97 | —CH₃ | —C₂H₅ | H | H | —NO₂ | H | H |
| T-98 | —OC₂H₅ | —C₃H₇ | H | H | H | —OH | H |
| T-99 | Br | —C₄H₉ | H | H | H | H | H |

Those having Formula [X]
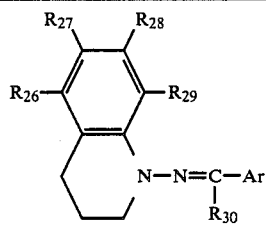
| No. | R₂₆ | R₂₇ | R₂₈ | R₂₉ | R₃₀ | Ar |
|---|---|---|---|---|---|---|
| T-100 | H | H | H | H | H | –C₆H₄–N(C₆H₅)₂ |
| T-101 | H | H | H | H | H | –C₆H₄–N(4-CH₃-C₆H₄)₂ |
| T-102 | H | H | H | H | H | –C₆H₄–N(C₆H₅)(4-CH₃-C₆H₄) |
| T-103 | H | H | H | H | H | –C₆H₄–N(C₆H₅)(4-OCH₃-C₆H₄) |
| T-104 | H | H | H | H | H | –C₆H₄–N(4-OCH₃-C₆H₄)₂ |
| T-105 | H | H | H | H | H | –C₆H₄–N(4-CH₃-C₆H₄)(4-OCH₃-C₆H₄) |

-continued
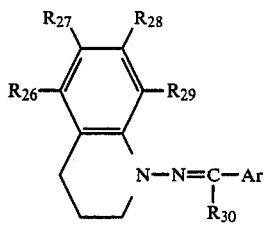
| No. | R26 | R27 | R28 | R29 | R30 | Ar |
|---|---|---|---|---|---|---|
| T-106 | H | H | H | H | H | -C₆H₄-N(p-tolyl)(4-OC₂H₅-C₆H₄) (diarylamino group: N-phenyl-N-(4-ethoxyphenyl)-p-toluidino) |
| T-107 | H | H | H | H | H | N(p-tolyl)(4-C₂H₅-C₆H₄)₂ |
| T-108 | H | H | H | H | H | N(p-tolyl)(4-C₈H₁₇-C₆H₄)₂ |
| T-109 | H | H | H | H | H | 9-phenylcarbazol-3-yl |
| T-110 | H | H | H | H | H | 9-ethylcarbazol-3-yl |
| T-111 | H | H | H | H | H | 9-methylcarbazol-3-yl |

-continued
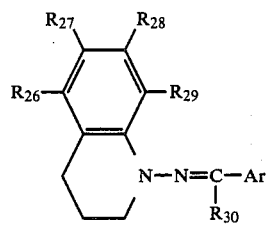
| No. | R26 | R27 | R28 | R29 | R30 | Ar |
|---|---|---|---|---|---|---|
| T-112 | H | H | H | H | H | 9-(p-tolyl)-3-methylcarbazol-N-yl |
| T-113 | H | H | H | H | H | p-(N,N-dimethylamino)phenyl |
| T-114 | H | H | H | H | H | p-(N,N-diethylamino)phenyl |
| T-115 | H | H | H | H | H | p-[N,N-bis(benzyl)amino]-p-tolyl |
| T-116 | H | —OCH$_3$ | H | H | H | p-(N,N-dimethylamino)-p-tolyl |
| T-117 | H | —OCH$_3$ | H | H | H | p-(N,N-diphenylamino)-p-tolyl |
| T-118 | H | —OCH$_3$ | H | H | H | 9-phenylcarbazol-N-yl |

-continued
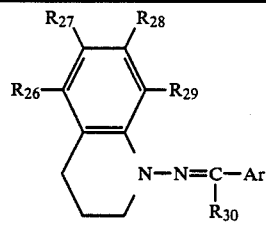
| No. | R26 | R27 | R28 | R29 | R30 | Ar |
|---|---|---|---|---|---|---|
| T-119 | H | —CH3 | H | H | H | 9-ethylcarbazol-3-yl |
| T-120 | H | —CH3 | H | H | H | 4-[N-(4-methoxyphenyl)-N-phenylamino]phenyl (with p-tolyl) |
| T-121 | —CH3 | H | H | H | —CH3 | 4-(diphenylamino)phenyl (p-tolyl-N,N-diphenyl) |
| T-122 | H | —CH | H | H | —CH3 | 9-phenylcarbazol-3-yl |
| T-123 | H | H | —CH | H | —CN | 9-ethylcarbazol-3-yl |
| T-124 | H | H | H | —CH3 | —CN | 4-(dimethylamino)phenyl |
| T-125 | —OCH2Ph | H | H | H | phenyl | 4-(diethylamino)phenyl |
| T-126 | H | —OCH3 | H | H | phenyl | 9-methylcarbazol-3-yl |

-continued
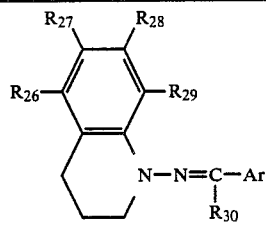
| No. | $R_{26}$ | $R_{27}$ | $R_{28}$ | $R_{29}$ | $R_{30}$ | Ar |
|---|---|---|---|---|---|---|
| T-127 | H | H | —$NO_2$ | H | phenyl | 4-(N,N-diphenylamino)phenyl |
| T-128 | H | H | H | —OH | phenyl | 4-[N-(4-methylphenyl)-N-phenylamino]phenyl |
| T-129 | H | H | H | H | phenyl | 4-[N-(4-methoxyphenyl)-N-phenylamino]phenyl |
| T-130 | H | H | H | H | phenyl | 4-[N,N-bis(4-methylphenyl)amino]phenyl |
| T-131 | H | H | H | H | —CH(4-phenylene)— | 4-(N,N-diphenylamino)phenyl |
| T-132 | H | H | H | H | —CH-phenyl | 9-phenylcarbazol-3-yl |

Those having Formula [XI]
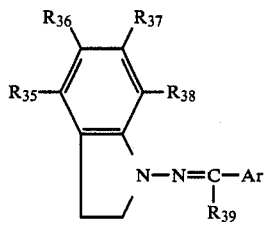
| No. | R35 | R36 | R37 | R38 | R39 | Ar |
|---|---|---|---|---|---|---|
| T-133 | H | H | H | H | H | 4-(N,N-diphenylamino)phenyl |
| T-134 | H | H | H | H | H | 4-(N,N-di-p-tolylamino)phenyl |
| T-135 | H | H | H | H | H | 4-(N-p-tolyl-N-phenylamino)phenyl |
| T-136 | H | H | H | H | H | 4-(N-(4-methoxyphenyl)-N-phenylamino)phenyl |
| T-137 | H | H | H | H | H | 4-(N,N-bis(4-methoxyphenyl)amino)phenyl |
| T-138 | H | H | H | H | H | 4-(N-p-tolyl-N-(4-methoxyphenyl)amino)phenyl |

-continued
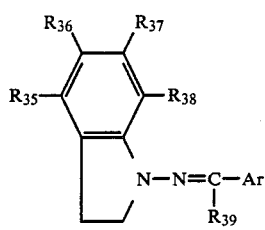
| No. | R35 | R36 | R37 | R38 | R39 | Ar |
|---|---|---|---|---|---|---|
| T-139 | H | H | H | H | H | 4-ethoxyphenyl-N-(p-tolyl)-N-phenylamino |
| T-140 | H | H | H | H | H | 4-ethylphenyl-N-(p-tolyl)-N-(4-ethylphenyl)amino |
| T-141 | H | H | H | H | H | 4-octylphenyl-N-(p-tolyl)-N-(4-octylphenyl)amino |
| T-142 | H | H | H | H | H | 9-phenylcarbazol-3-yl |
| T-143 | H | H | H | H | H | 9-ethylcarbazol-3-yl |
| T-144 | H | H | H | H | H | 9-methylcarbazol-3-yl |

-continued
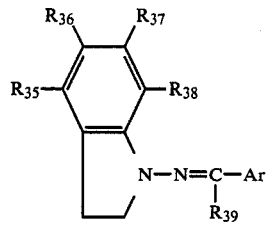
| No. | R35 | R36 | R37 | R38 | R39 | Ar |
|---|---|---|---|---|---|---|
| T-145 | H | H | H | H | H | 9-(p-tolyl)carbazol-3-yl |
| T-146 | H | H | H | H | H | 4-(dimethylamino)phenyl |
| T-147 | H | H | H | H | H | 4-(diethylamino)phenyl |
| T-148 | H | H | H | H | H | 4-(dibenzylamino)phenyl |
| T-149 | H | —OCH₃ | H | H | H | 4-(dimethylamino)phenyl |
| T-150 | H | —OCH₃ | H | H | H | 4-(diphenylamino)phenyl |
| T-151 | H | —OCH₃ | H | H | H | 9-phenylcarbazol-3-yl |

-continued
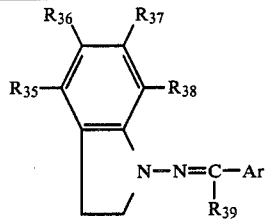
| No. | $R_{35}$ | $R_{36}$ | $R_{37}$ | $R_{38}$ | $R_{39}$ | Ar |
|---|---|---|---|---|---|---|
| T-152 | H | —CH₃ | H | H | H | 9-ethylcarbazol-3-yl |
| T-153 | H | —CH₃ | H | H | H | 4-[N-(4-methoxyphenyl)-N-phenylamino]phenyl (with p-tolyl) |
| T-154 | —CH₃ | H | H | H | —CH₃ | 4-(diphenylamino)phenyl |
| T-155 | H | —CH₃ | H | H | —CH₃ | 9-phenylcarbazol-3-yl |
| T-156 | H | H | —CH | H | —CN | 9-ethylcarbazol-3-yl |
| T-157 | H | H | H | —CH₃ | —CN | 4-(dimethylamino)phenyl |
| T-158 | —OCH₂C₆H₅ | H | H | H | phenyl | 4-(diethylamino)phenyl |
| T-159 | H | —OCH₃ | H | H | phenyl | 9-methylcarbazol-3-yl |

-continued
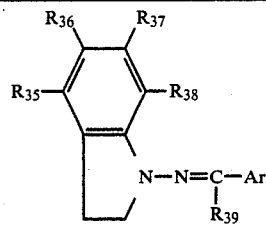
| No. | $R_{35}$ | $R_{36}$ | $R_{37}$ | $R_{38}$ | $R_{39}$ | Ar |
|---|---|---|---|---|---|---|
| T-160 | H | H | —NO$_2$ | H | phenyl | 4-(N,N-diphenylamino)phenyl |
| T-161 | H | H | H | —OH | phenyl | 4-[N-phenyl-N-(4-methylphenyl)amino]phenyl |
| T-162 | H | H | H | H | phenyl | 4-[N-phenyl-N-(4-methoxyphenyl)amino]phenyl |
| T-163 | H | H | H | H | phenyl | 4-[N,N-bis(4-methylphenyl)amino]phenyl |
| T-164 | H | H | H | H | —CH$_2$-phenyl | 4-(N,N-diphenylamino)phenyl |
| T-165 | H | H | H | H | —CH$_2$-phenyl | 9-phenylcarbazol-3-yl |

Those having Formula [XIII]
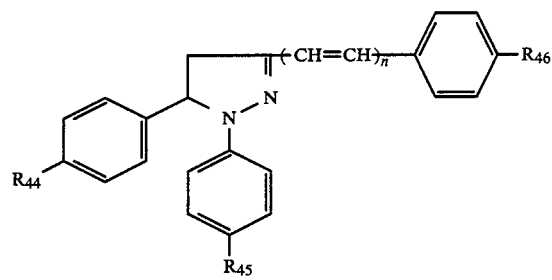
| No. | $R_{44}$ | $R_{45}$ | $R_{46}$ | n |
|---|---|---|---|---|
| T-166 | H | H | H | 0 |
| T-167 | H | H | —CH$_3$ | 1 |
| T-168 | H | H | —C$_2$H$_5$ | 0 |
| T-169 | H | H | —OCH$_3$ | 1 |
| T-170 | H | H | —OC$_2$H$_5$ | 0 |
| T-171 | H | H | Cl | 1 |
| T-172 | H | H | Br | 1 |
| T-173 | H | H | F | 1 |
| T-174 | H | H | I | 1 |
| T-175 | H | H | —N(CH$_3$)$_2$ | 0 |
| T-176 | H | H | —N(C$_6$H$_5$)$_2$ | 1 |
| T-177 | H | H | —N(C$_2$H$_5$)$_2$ | 0 |
| T-178 | H | H | —N(CH$_2$C$_6$H$_5$)$_2$ | 1 |
| T-179 | H | H | —CN | 0 |
| T-180 | H | H | —NO$_2$ | 1 |
| T-181 | H | H | —OH | 1 |
| T-182 | H | H | —C$_8$H$_{17}$ | 1 |
| T-183 | —CH$_3$ | H | H | 1 |
| T-184 | —CH$_3$ | H | —CH$_3$ | 1 |
| T-185 | —CH$_3$ | H | —OCH$_3$ | 1 |
| T-186 | —CH$_3$ | H | —Cl | 1 |
| T-187 | —CH$_3$ | H | —N(C$_2$H$_5$)$_2$ | 1 |
| T-188 | —OCH$_3$ | —CH$_3$ | —N(C$_6$H$_5$)$_2$ | 1 |
| T-189 | —OCH$_3$ | —OCH$_3$ | —OCH$_3$ | 1 |

-continued
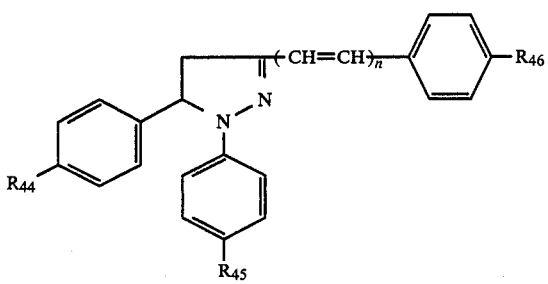
| No. | R44 | R45 | R46 | n |
|---|---|---|---|---|
| T-190 | —OCH$_3$ | —N(C$_2$H$_5$)$_2$ | H | 1 |
| T-191 | Cl | —N(C$_6$H$_5$)$_2$ | H | 1 |
| T-192 | —OH | —OH | —OH | 1 |
| T-193 | —N(C$_2$H$_5$)$_2$ | H | H | 1 |
| T-194 | —N(C$_2$H$_5$)$_2$ | H | —OCH$_3$ | 1 |
| T-195 | —N(C$_2$H$_5$)$_2$ | H | —N(C$_2$H$_5$)$_2$ | 1 |
| T-196 | H | —N(C$_2$H$_5$)$_2$ | —CH$_3$ | 1 |
| T-197 | H | —N(CH$_2$C$_6$H$_5$)$_2$ | —OCH$_3$ | 1 |
| T-198 | H | —CN | H | 1 |

Those having Formula [XIII]

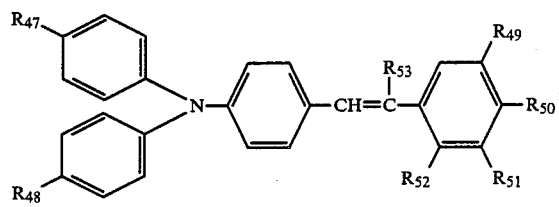

| No. | $R_{47}$ | $R_{48}$ | $R_{49}$ | $R_{50}$ | $R_{51}$ | $R_{52}$ | $R_{53}$ |
|---|---|---|---|---|---|---|---|
| T-199 | H | H | H | H | H | H | H |
| T-200 | H | H | H | —CH$_3$ | H | H | H |
| T-201 | H | H | H | —OCH$_3$ | H | H | H |
| T-202 | H | H | H | —Cl | H | H | H |
| T-203 | H | H | —Cl | H | H | H | H |
| T-204 | H | H | —CH$_3$ | H | H | H | H |
| T-205 | H | H | —OCH$_3$ | H | H | H | —Ph |
| T-206 | H | H | H | H | H | H | —Ph |
| T-207 | H | H | H | —CH | H | H | —Ph |
| T-208 | H | —CH$_3$ | H | H | H | H | H |
| T-209 | H | —CH$_3$ | H | —CH$_3$ | H | H | H |
| T-210 | H | —CH$_3$ | H | —OCH$_3$ | H | H | H |
| T-211 | H | —CH$_3$ | H | —N(C$_2$H$_5$)$_2$ | H | H | H |
| T-212 | H | —CH$_3$ | —CH | H | H | H | H |
| T-213 | H | —CH$_3$ | —Cl | H | H | H | H |
| T-214 | H | —CH$_3$ | H | —CH | —CH$_3$ | H | H |
| T-215 | H | —CH$_3$ | —OCH$_3$ | —OCH$_3$ | —OCH$_3$ | H | H |
| T-216 | H | —CH$_3$ | H | H | —NO$_2$ | H | H |
| T-217 | H | —CH$_3$ | H | H | H | H | —Ph |
| T-218 | H | —CH$_3$ | H | —CH$_3$ | H | H | —Ph |
| T-219 | H | —CH$_3$ | H | Br | H | H | —Ph |
| T-220 | H | —OCH$_3$ | H | H | H | H | H |
| T-221 | H | —OCH$_3$ | H | —CH$_3$ | H | H | H |
| T-222 | H | —OCH$_3$ | H | —OCH$_3$ | H | H | H |
| T-223 | H | —OCH$_3$ | H | Br | H | H | H |
| T-224 | H | —OCH$_3$ | —OCH$_3$ | H | H | H | H |
| T-225 | H | —OCH$_3$ | —NO$_2$ | H | H | H | H |
| T-226 | H | —OCH$_3$ | —OCH$_3$ | —OCH$_3$ | H | H | H |
| T-227 | H | —OCH$_3$ | —CH$_3$ | H | H | —CH$_3$ | H |
| T-228 | H | —OCH$_3$ | H | —C$_2$H$_5$ | H | H | H |

-continued

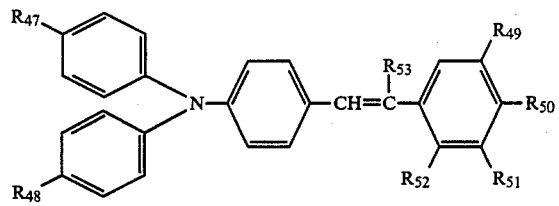

| No. | R47 | R48 | R49 | R50 | R51 | R52 | R53 |
|---|---|---|---|---|---|---|---|
| T-229 | H | —OCH$_3$ | H | H | H | H | —C$_6$H$_5$ |
| T-230 | H | —OCH$_3$ | H | —CH$_3$ | H | H | —C$_6$H$_5$ |
| T-231 | H | —OCH$_3$ | —OCH$_3$ | H | H | H | —C$_6$H$_5$ |
| T-232 | —CH$_3$ | —CH$_3$ | H | H | H | H | H |
| T-233 | —CH$_3$ | —CH$_3$ | H | —CH$_3$ | H | H | H |
| T-234 | —CH$_3$ | —CH$_3$ | H | —OCH$_3$ | H | H | H |
| T-235 | —CH$_3$ | —CH$_3$ | H | —Cl | H | H | H |
| T-236 | —CH$_3$ | —CH$_3$ | H | —Br | H | H | H |
| T-237 | —CH$_3$ | —CH$_3$ | —CH | H | H | H | H |
| T-238 | —CH$_3$ | —CH$_3$ | —OCH | H | H | H | H |
| T-239 | —CH$_3$ | —CH$_3$ | —CH$_3$ | —OCH$_3$ | H | H | H |
| T-240 | —CH$_3$ | —CH$_3$ | H | H | H | H | —C$_6$H$_5$ |
| T-241 | —CH$_3$ | —CH$_3$ | —OCH$_3$ | —OCH$_3$ | —OCH$_3$ | H | —C$_6$H$_5$ |
| T-242 | —CH$_3$ | —CH$_3$ | —OCH$_3$ | —OCH$_3$ | H | H | —C$_6$H$_5$ |
| T-243 | —CH$_3$ | —CH$_3$ | —CH$_3$ | H | H | H | —C$_6$H$_5$ |
| T-244 | —CH$_3$ | —OCH$_3$ | H | H | H | H | H |
| T-245 | —CH$_3$ | —OCH$_3$ | H | —CH$_3$ | H | H | H |
| T-246 | —CH$_3$ | —OCH$_3$ | H | —OCH$_3$ | H | H | H |
| T-247 | —CH$_3$ | —OCH$_3$ | H | —Cl | H | H | H |
| T-248 | —CH$_3$ | —OCH$_3$ | —CH$_3$ | H | H | H | H |
| T-249 | —CH$_3$ | —OCH$_3$ | —CH$_3$ | —CH$_3$ | H | H | H |
| T-250 | —CH$_3$ | —OCH$_3$ | —OCH$_3$ | —OH | —OCH$_3$ | H | H |
| T-251 | —CH$_3$ | —OCH$_3$ | H | 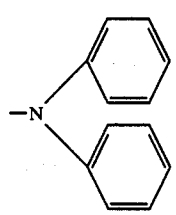 | H | H | H |

-continued

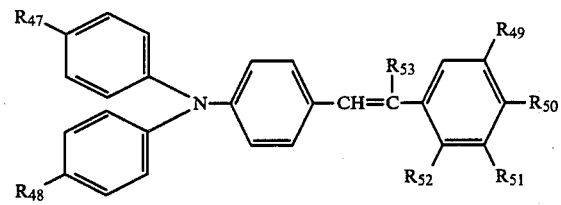

| No. | $R_{47}$ | $R_{48}$ | $R_{49}$ | $R_{50}$ | $R_{51}$ | $R_{52}$ | $R_{53}$ |
|---|---|---|---|---|---|---|---|
| T-252 | —$CH_3$ | —$OCH_3$ | H | H | H | H | —C$_6$H$_5$ |
| T-253 | —$CH_3$ | —$OCH_3$ | H | —N(CH$_3$)$_2$ | H | H | —C$_6$H$_5$ |
| T-254 | —$CH_3$ | —$OCH_3$ | —$NO_2$ | H | H | H | —C$_6$H$_5$ |
| T-255 | —$CH_3$ | —$OCH_3$ | H | —$OCH_3$ | H | H | —C$_6$H$_4$-$CH_3$ |
| T-256 | —$OCH_3$ | —$OCH_3$ | H | H | H | H | H |
| T-257 | —$OCH_3$ | —$OCH_3$ | H | —$CH_3$ | H | H | H |
| T-258 | —$OCH_3$ | —$OCH_3$ | H | —$OCH_3$ | H | H | H |
| T-259 | —$OCH_3$ | —$OCH_3$ | H | —F | H | H | H |
| T-260 | —$OCH_3$ | —$OCH_3$ | H | —N(CH$_3$)$_2$ | H | H | H |
| T-261 | —$OCH_3$ | —$OCH_3$ | H | —CN | H | H | H |
| T-262 | —$OCH_3$ | —$OCH_3$ | —$NO_2$ | H | H | H | H |
| T-263 | —$OCH_3$ | —$OCH_3$ | H | —OH | H | H | H |
| T-264 | —$OCH_3$ | —$OCH_3$ | H | H | H | H | —C$_6$H$_5$ |
| T-265 | —$OCH_3$ | —$OCH_3$ | H | —$CH_3$ | H | H | —C$_6$H$_5$ |
| T-266 | —$OCH_3$ | —$OCH_3$ | H | —$OCH_3$ | H | H | —C$_6$H$_5$ |
| T-267 | —$OCH_3$ | —$OCH_3$ | H | H | H | Cl | —C$_6$H$_5$ |
| T-268 | H | $C_2H_5$ | H | H | H | H | H |
| T-269 | H | $C_2H_5$ | H | —$CH_3$ | H | H | —C$_6$H$_5$ |

-continued
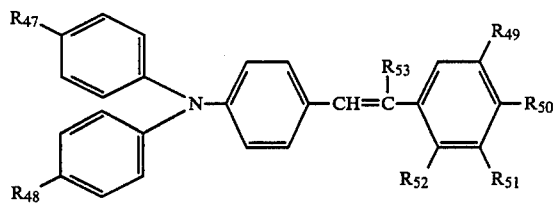
| No. | $R_{47}$ | $R_{48}$ | $R_{49}$ | $R_{50}$ | $R_{51}$ | $R_{52}$ | $R_{53}$ |
|---|---|---|---|---|---|---|---|
| T-270 | $C_2H_5$ | $C_2H_5$ | H | —$OCH_3$ | H | H | H |
| T-271 | H | $OCH_3$ | —$CH_3$ | H | H | H | —C$_6$H$_5$ |
| T-272 | H | $OC_2H_5$ | —Br | H | H | H | H |
| T-273 | H | —N($C_2H_5$)$_2$ | H | H | H | —Cl | H |
| T-274 | H | —N($C_2H_5$)$_2$ | H | H | H | —$CH_3$ | —C$_6$H$_5$ |
| T-275 | $NO_2$ | $NO_2$ | —$NO_2$ | H | H | H | —C$_6$H$_5$ |
| T-276 | H | $NO_2$ | —$CH_3$ | —$CH_3$ | H | H | —C$_6$H$_5$ |
| T-277 | H | OH | H | —N($CH_3$)$_2$ | H | H | H |
| T-278 | OH | OH | —CN | H | H | H | H |
| T-279 | OH | $CH_3$ | H | —N($CH_2C_6H_5$)$_2$ | H | H | H |

Those having Formula [XIV]

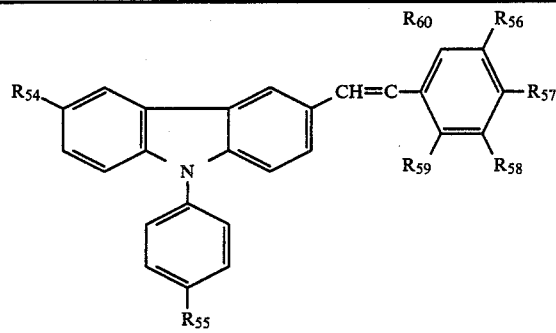

| No. | $R_{54}$ | $R_{55}$ | $R_{56}$ | $R_{57}$ | $R_{58}$ | $R_{59}$ | $R_{60}$ |
|---|---|---|---|---|---|---|---|
| T-280 | H | H | H | H | H | H | H |
| T-281 | H | H | H | —CH₃ | H | H | H |
| T-282 | H | H | H | —OCH₃ | H | H | H |
| T-283 | H | H | —CH₃ | H | H | H | H |
| T-284 | H | H | —OCH₃ | H | H | H | H |
| T-285 | H | H | H | Cl | H | H | H |
| T-286 | H | H | —CH₃ | —CH₃ | H | H | ⌬ |
| T-287 | H | H | —OCH₃ | —OCH₃ | H | H | ⌬ |
| T-288 | H | H | —NO₂ | H | H | H | ⌬ |
| T-289 | H | —CH₃ | H | H | H | H | H |
| T-290 | H | —CH₃ | H | —CH₃ | H | H | H |
| T-291 | H | —CH₃ | H | —OCH₃ | H | H | H |
| T-292 | H | —CH₃ | —CH | H | H | H | H |
| T-293 | H | —CH₃ | —OCH | H | H | H | H |
| T-294 | H | —CH₃ | H | H | H | —Cl | H |
| T-295 | H | —CH₃ | H | H | H | —Br | H |
| T-296 | H | —CH₃ | —NO₂ | H | H | H | H |
| T-297 | H | —CH₃ | H | —N(CH₃)₂ | H | H | ⌬ |
| T-298 | H | —CH₃ | H | H | H | H | ⌬ |
| T-299 | H | —CH₃ | H | —OCH₃ | H | H | ⌬ |
| T-300 | H | —CH₃ | H | —CN | H | H | ⌬ |
| T-301 | H | —OCH₃ | H | H | H | H | H |
| T-302 | H | —OCH₃ | H | —CH₃ | H | H | H |
| T-303 | H | —OCH₃ | H | —OCH₃ | H | H | H |

-continued

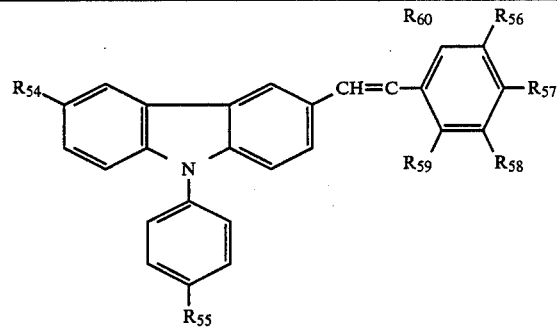

| No. | $R_{54}$ | $R_{55}$ | $R_{56}$ | $R_{57}$ | $R_{58}$ | $R_{59}$ | $R_{60}$ |
|---|---|---|---|---|---|---|---|
| T-304 | H | —OCH$_3$ | H | —N(C$_2$H$_5$)$_2$ | H | H | H |
| T-305 | H | —OCH$_3$ | H | —N(CH$_2$C$_6$H$_5$)$_2$ | H | H | H |
| T-306 | H | —OCH$_3$ | —NO$_2$ | H | H | H | H |
| T-307 | H | —OCH$_3$ | H | H | H | —Cl | H |
| T-308 | H | —OCH$_3$ | H | H | H | —Br | H |
| T-309 | H | —OCH$_3$ | H | H | H | H | —C$_6$H$_5$ |
| T-310 | H | —OCH$_3$ | —CH$_3$ | —CH$_3$ | H | H | —C$_6$H$_5$ |
| T-311 | H | —OCH$_3$ | —OCH$_3$ | —OCH$_3$ | —OCH$_3$ | H | —C$_6$H$_5$ |
| T-312 | H | —OCH$_3$ | H | —OH | H | H | —C$_6$H$_5$ |
| T-313 | H | —C$_2$H$_5$ | H | H | H | H | H |
| T-314 | H | —C$_2$H$_5$ | H | CH | H | H | H |
| T-315 | H | —OC$_2$H$_5$ | H | H | H | H | H |
| T-316 | H | —OC$_2$H$_5$ | H | CH | H | H | H |
| T-317 | H | —N(CH$_3$)$_2$ | H | H | H | H | H |
| T-318 | H | —N(C$_2$H$_5$)$_2$ | H | H | H | H | H |
| T-319 | H | Cl | H | H | H | H | H |
| T-320 | H | Br | H | Br | H | H | H |

-continued
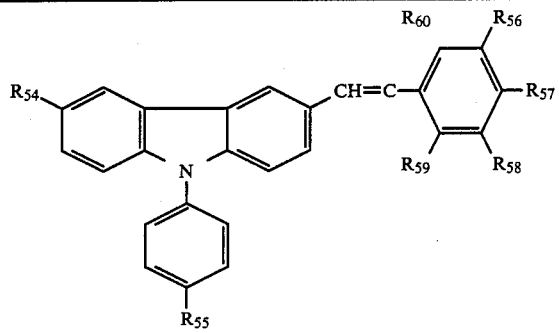
| No. | R54 | R55 | R56 | R57 | R58 | R59 | R60 |
|---|---|---|---|---|---|---|---|
| T-321 | H | —OH | H | —OH | H | H | phenyl |
| T-322 | H | —CN | H | $CH_3$ | H | H | phenyl |
| T-323 | H | —$NO_2$ | H | —$OCH_3$ | H | H | phenyl |
| T-324 | H | —$C_8H_{17}$ | H | —N($CH_3$)$_2$ | H | H | phenyl |
| T-325 | —$CH_3$ | H | H | H | H | H | H |
| T-326 | —$CH_3$ | —$CH_3$ | H | —$CH_3$ | H | H | H |
| T-327 | —$CH_3$ | —N($CH_3$)$_2$ | H | H | H | H | H |
| T-328 | —$OCH_3$ | H | H | —$CH_3$ | H | H | H |
| T-329 | —$OCH_3$ | —$OCH_3$ | H | —$OCH_3$ | H | H | H |
| T-330 | —$OCH_3$ | Cl | H | —Cl | H | H | H |
| T-331 | —$NO_2$ | Br | H | H | H | H | H |
| T-332 | —$NO_2$ | F | H | —Br | H | H | H |
| T-333 | Cl | —N(phenyl)$_2$ | H | H | H | H | phenyl |
| T-334 | Br | Br | H | —$CH_3$ | H | H | phenyl |
| T-335 | F | —CN | H | —$OCH_3$ | H | H | phenyl |

-continued

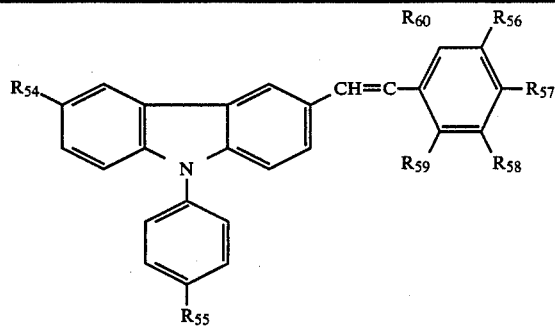

| No. | $R_{54}$ | $R_{55}$ | $R_{56}$ | $R_{57}$ | $R_{58}$ | $R_{59}$ | $R_{60}$ |
|---|---|---|---|---|---|---|---|
| T-336 | $-N{<}^{C_2H_5}_{C_2H_5}$ | $-OH$ | H | H | H | H | –⟨phenyl⟩ |

Those having Formula [XV]

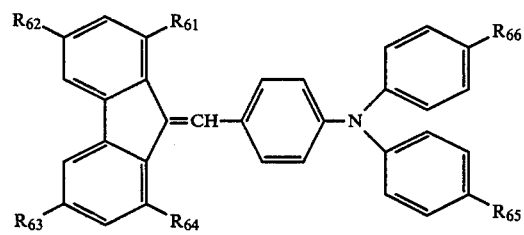

| No. | $R_{61}$ | $R_{62}$ | $R_{63}$ | $R_{64}$ | $R_{65}$ | $R_{66}$ |
|---|---|---|---|---|---|---|
| T-337 | H | H | H | H | H | H |
| T-338 | $NO_2$ | H | H | H | H | H |
| T-339 | Cl | H | H | H | H | H |
| T-340 | H | H | H | H | H | $CH_3$ |
| T-341 | Cl | H | H | Cl | H | $CH_3$ |
| T-342 | H | Cl | Cl | H | H | $CH_3$ |
| T-343 | H | H | H | H | H | $OCH_3$ |
| T-344 | $-OCH_3$ | H | H | H | H | $OCH_3$ |
| T-345 | $-CH_3$ | H | H | H | H | $OCH_3$ |
| T-346 | H | H | H | H | $CH_3$ | $CH_3$ |
| T-347 | Cl | H | H | H | $CH_3$ | $CH_3$ |
| T-348 | $-OCH_3$ | H | H | H | $CH_3$ | $CH_3$ |
| T-349 | H | H | H | H | $CH_3$ | $OCH_3$ |
| T-350 | Cl | H | H | H | $CH_3$ | $OCH_3$ |
| T-351 | $-OCH_3$ | H | H | H | $CH_3$ | $OCH_3$ |
| T-352 | H | H | H | H | $OCH_3$ | $OCH_3$ |
| T-353 | Cl | H | H | H | $OCH_3$ | $OCH_3$ |
| T-354 | $-OCH_3$ | H | H | H | $OCH_3$ | $OCH_3$ |
| T-355 | H | H | H | H | $C_8H_{17}$ | $C_8H_{17}$ |
| T-356 | H | H | H | H | Cl | Cl |
| T-357 | H | H | H | H | $-CN$ | $-CN$ |

The carrier-generating layer may be formed by either of the following methods:

(M-1) A method in which a solution prepared by dissolving an azo compound into an appropriate solvent and, if necessary, additionally mixing a binder thereinto is coated.

(M-2) A method in which a dispersion liquid prepared by making an azo compound finely particulate in a dispersion medium by means of a ball mill or homomixer and, if necessary, additionally mixing a binder thereinto is coated.

The solvent or dispersion medium for use in the formation of the carrier-generating layer include n-butylamine, diethylamine, ethylene diamine, isopropanolamine, triethanolamine, triethylenediamine, N,N-dimethylformamide, acetone, methylethyl ketone, cyclohexanone, benzene, toluene, xylene, chloroform, 1,2-dichloroethane, dichloromethane, tetrahydrofuran, dioxane, methanol, ethanol, isopropanol, ethyl acetate, butyl acetate, dimethyl sulfoxide, and the like.

The binder to be used for the carrier-generating layer or carrier-transport layer may be any discretional one, but is desirable to be an electric-insulating film-formable high-molecular polymer which is hydrophobic and highly dielectric. Such high-molecular polymers include, e.g., the following examples, but are not limited thereto:

(P-1) Polycarbonate
(P-2) Polyester
(P-3) Methacrylic resin
(P-4) Acrylic resin
(P-5) Polyvinyl chloride
(P-6) Polyvinylidene chloride
(P-7) Polystyrene
(P-8) Polyvinyl acetate
(P-9) Styrene-butadiene copolymer
(P-10) Vinylidene chloride-acrylonitrile copolymer
(P-11) Vinyl chloride-vinyl acetate copolymer
(P-12) Vinyl chloride-vinyl acetate-maleic anhydride copolymer
(P-13) Silicone resin
(P-14) Silicone-alkyd resin
(P-15) Phenol-formaldehyde resin
(P-16) Styrene-alkyd resin
(P-17) Poly-N-vinylcarbazole
(P-18) Polyvinyl butyral
(P-19) Polyvinyl formal These binder materials may be used along or in a mixture of two or more of them.

The thickness of the thus formed carrier-generating layer 2 is preferably from 0.01 $\mu$m to 20 $\mu$m, and more preferably from 0.05 $\mu$m to 5 $\mu$m. The particle size of the azo compound in the case where the carrier-generating layer or photosensitive layer is of the dispersion type is preferably not more than 5 $\mu$m, and more preferably not more than 1 $\mu$m.

The conductive support material applicable to the photoreceptor of this invention includes metallic plates or drums whose metals include alloys: conductive polymers; paper made conductive by being coated, vacuum-deposited or laminated thereon with a conductive compound such as indium oxide or with a metallic thin layer such as of aluminum, palladium, gold, etc., or an alloy therof; and the like. Those usable as the interlayer such as an adhesion layer or barrier layer include organic high-molecular materials such as polyvinyl alcohol, ethyl cellulose, carboxymethyl cellulose, and inorganic materials such as aluminum oxide, etc., in addition to the foregoing high-molecular polymers used as the binder.

The photoreceptor of this invention is as has been described above. As will be apparent from the following examples the photoreceptor is excellent in the chargeability, sensitivity and image formability, and so excellently durable that it is hardly fatigued or deteriorated even when repeatedly used.

The present invention will be illustrated in detail by the following examples, but the embodiments of the invention are not limited by the examples.

EXAMPLES

Example 1

Two grams of Exemplified Compound A-1 and 2 g of polycarbonate resin "Panlite L-1250" (manufactured by Teijin Chemical Industry Co., Ltd.) were added to 110 ml of 1,2-dichloroethane, and were dispersed over a period of 12 hours by means of a ball mill. This dispersed liquid was coated on an aluminum-vacuum-deposited polyester film so that the dry thickness is 0.3 μm to thereby form a carrier-generating layer, and further on this was coated a liquid as a carrier-transport layer prepared by dissolving 6 g of the foregoing compound T-201 and 10 g of polycarbonate resin "Panlite L-1250" into 110 ml of 1,2-dichloroethane so that the dry thickness is 15 μm, whereby a photoreceptor of this invention was prepared.

The thus obtained photoreceptor was evaluated with respect to the following characteristics by use of an electronic paper tester Model SP-428, manufactured by Kawaguchi Denki Seisakusho K.K. The photoreceptor was charged for five seconds at a charging voltage of −6 KV, then allowed to stand for five seconds in the dark, and then exposed to a halogen lamp light so that the illuminance on the photosensitive surface of the photoreceptor is 35 luxes to thereby find the exposure (half-exposure) E 2/1 that is required for reducing the surface potential by half. Also, the surface potential (residual potential) $V_R$ of the photoreceptor after being subjected to a 30-lux.sec exposure was found. Further, the same tests and measurements were repeated 100 times. The obtained results are as given in Table 1.

TABLE 1

|  | First | 100th |
|---|---|---|
| E ½ (lux.sec) | 2.4 | 2.5 |
| $V_R$ | 0 | 0 |

Comparative Example 1

A comparative photoreceptor was prepared in the same manner as in Example 1 except that the following bisazo compound C-(1) was used as the carrier-generating material.

C-(1)

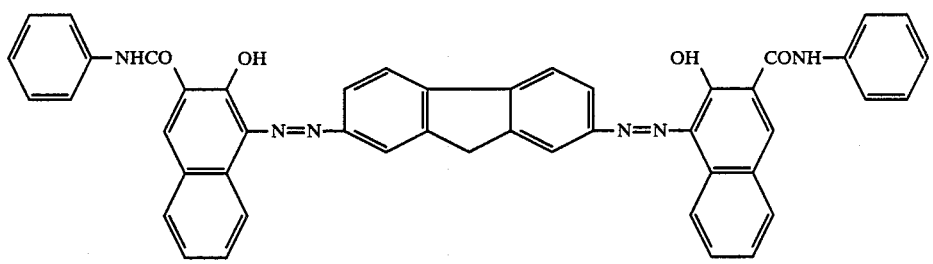

This comparative photoreceptor was measured in the same manner as in Example 1, and the results as shown in Table 2 were obtained.

TABLE 2

|  | First | 100th |
|---|---|---|
| E ½ (lux.sec) | 6.0 | 6.9 |
| $V_R$ (V) | 0 | −10 |

As is apparent from the above table, the photoreceptor of this invention is very excellent in the sensitivity as well as in the residual potential, and also in the stability when used repeatedly, as compared to the comparative photoreceptor.

Examples 2 through 4

Photoreceptor samples of this invention were prepared in the same manner as in Example 1 except that Exemplified Compounds A-4, A-32 and A-50 were used as the carrier-generating material, and the foregoing compounds T-174, T-188 and T-185 were used as the carrier-transport material. These resulting photoreceptors were tested and measured in the same manner as in Example 1, whereby the results as given in Table 3 were obtained.

TABLE 3

| Example No. | Azo compound | First E ½ (lux.sec) | First $V_R$ (V) | 100th E ½ (lux.sec) | 100th $V_R$ (V) |
|---|---|---|---|---|---|
| 1 | Exemplified Compound | 1.9 | 0 | 1.8 | 0 |

TABLE 3-continued

| Example No. | Azo compound | First E ½ (lux.sec) | V_R (V) | 100th E ½ (lux.sec) | V_R (V) |
| --- | --- | --- | --- | --- | --- |
| | A-4 | | | | |
| 2 | Exemplified Compound A-32 | 2.6 | 0 | 2.7 | 0 |
| 3 | Exemplified Compound A-50 | 3.0 | 0 | 3.2 | 0 |

Example 5

On an aluminum foil-laminated polyester film conductive support was provided on 0.05 μm-thick interlayer comprised of a vinyl chloride-vinyl acetate-maleic anhydride copolymer "Eslec MF-10" (a product of Sekisui Chemical Co., Ltd.), and on this was coated a dispersion liquid prepared by mixing and dispersing 2 g of Exemplified Compound A-5 into 110 ml of 1,2-dichloroethane for 24 hours by means of a ball mill to thereby form a carrier-generating layer so that the dry thickness is 0.5 μm. On this carrier-generating layer was coated a solution of 6 g of the foregoing compound T-109 and 10 g of a methacrylic resin "Acrypet" (a product of Mitsubishi Rayon Co., Ltd.) both dissolved in 70 ml of 1,2-dichloroethane to thereby form a carrier-transport layer so that the dry thickness is 10 μm, whereby a photoreceptor of this invention was obtained.

This photoreceptor sample was tested and measured in the same manner as in Example 1, whereby the first test results E ½ = 2.2 lux.sec and $V_R = 0_v$ were obtained.

Example 6

On the same interlayer-provided conductive support as that used in Example 5 was coated an ethylenediamine 1% Exemplified Compound A-98 solution so that the dry thickness is 0.1 μm, whereby a carrier-generating layer was formed. After that, on this was coated a solution of 6 g of the foregoing compound T-213 and 10 g of a polyester resin "Vylon 200" (a product of Toyo Spinning Co., Ltd.) both dissolved in 70 ml of 1,2-dichloroethane to thereby form a carrier-transport layer so that the dry thickness is 12 μm, whereby a photoreceptor of this invention was prepared.

This photoreceptor sample was tested and measured in the same manner as in Example 1, whereby the results as given in Table 4 were obtained.

Comparative Example 2

A photoreceptor sample was prepared in the same manner as in Example 6 except that the Exemplified Compound A-98 used in Example 6 was replaced by bisazo compound C-(2) having the following structural formula.

The thus obtained photoreceptor was tested and measured in the same manner as in Example 1, and the results obtained are shown in Table 4.

C-(2)

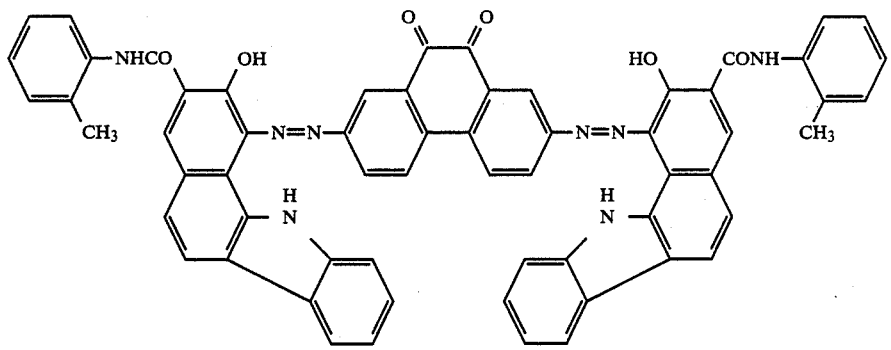

TABLE 4

| | First E ½ (lux.sec) | V_R (V) | 100th E ½ (lux.sec) | V_R (V) |
| --- | --- | --- | --- | --- |
| Example 6 | 2.9 | 0 | 3.0 | 0 |
| Comparative example 2 | 6.5 | 0 | 10.4 | −30 |

Example 7

A carrier-generating layer was formed in the same manner as in Example 5 except that the Exemplified Compound A-5 was replaced by Exemplified Compund A-21. On this was coated a solution of 6 g of the foregoing compound T-212 and 10 g of a polycarbonate "Panlite L-1250" (a product of Teijin Chemical Industry Co., Ltd.) both dissolved in 70 ml of 1,2-dichloroethane to thereby form a carrier-transport layer so that the dry thickness is 20 μm, whereby a photoreceptor of this invention was prepared.

This photoreceptor sample was tested and measured in the same manner as in Example 1, and the results were E ½ = 2.2 lux.sec and $V_R = 0_v$.

Example 8

On the surface of a 100 mm-diameter aluminum drum was provided a 0.05 μm-thick interlayer comprises of a vinyl chloride-vinyl acetate-maleic anhydride copolymer "Eslec MF-10" (a product of Sekisui Chemical Co., Ltd.), and on this was coated a dispersion liquid of 4 g of Exemplified Compound A-3 mixed and dispersed for 24 hours by a ball mill into 400 ml of 1,2-dichloroethane to thereby form a carrier-generating layer so that the dry thickness is 0.6 μm.

Further on this was coated a solution of 30 g of the foregoing compound T-112 and 50 g of a polycarbonate resin "Iupilon S-1000" (a product of Mitsubishi Gas Chemicals Co., Ltd.) both dissolved in 400 ml of 1,2-dichloroethane to form a carrier-transport layer so that the dry thickness is 25 μm, whereby a drum-form electrophotographic photoreceptor was prepared.

The thus prepared photoreceptor drum was loaded in a remodelled unit of Electrophotographic Copier U-Bix 1600MR (manufactured by Konishiroku Photo Industry Co., Ltd.) to make copies of an image, and as a result, very-true-to-the-original and clear image copies were obtained. The quality of the reproduced image was unchanged even after repeating the copying operation 10,000 times.

Comparative Example 3

A drum-form comparative photoreceptor was prepared in the same manner as in Example 8 except that the Exemplified Compound A-3 used in Example 8 was replaced by bisazo compound C-(3) having the following structural formula, and then evaluated with respect to the quality of the image copies obtained therefrom in the same manner as in Example 8, and as a result, none but fogged image copies were obtained. And as the copying is repeated, the contrast of the copy image becomes lowered, and almost no appreciable copy image was obtained after 2000-time copying operations.

C-(3)

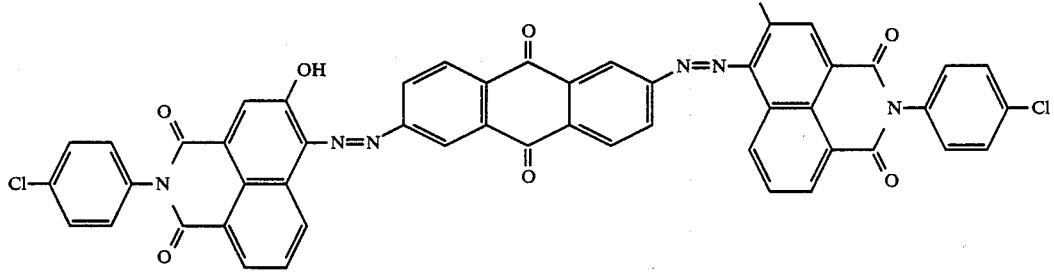

respect to $E_{\frac{1}{2}}$ and $V_R$, and the first result were $E_{\frac{1}{2}}=4.1$ lux.sec and $V_R=+3v$ Example 10

On an aluminum-deposited polyester film was provided a carrier-transport layer by coating a solution of 6 g of the foregoing compound T-119 and 10 g of a polyester resin "Vylon 200" (a product of Toyo Spinning Co., Ltd.) dissolved in 70 ml of 1,2-dichloroethane so that the dry thickness is 10 μm.

On this was then coated a dispersion liquid of 1 g of Exemplified Compound A-202 and 1 g of Exemplified Compound A-1 both mixed and dispersed for 24 hours by means of a ball mill into 110 ml of 1,2-dichloroethane to form a carrier-generating layer so that the dry thickness is 0.5 μm, whereby a photoreceptor of this invention was prepared.

The thus obtained photoreceptor was evaluated in the same manner as in Example 9, and the results were $E_{\frac{1}{2}}=1.9$ lux.sec and $V_R=+5v$.

Example 11

On an aluminum foil-laminated polyester film conductive support was provided a 0.05 μm-thick interlayer comprised of a vinyl chloride-vinyl acetate-maleic anhydride copolymer "Eslec MF-10" (a product of Sekisui Chemical Co., Ltd.), and on this was then coated a dispersion liquid of 4 g of Exemplified Compound A-101, 8 g of the foregoing compound T-210, and 3 g of a polycarbonate resin "Panlite L-1250" (a product of Teijin Chemical Industry Co., Ltd.) all added to and dispersed for 24 hours by means of a sand grinder into 100 ml of dichloroethane to form a layer so that the dry thickness is 10 μm, whereby a photoreceptor was prepared.

Example 9

On an aluminum foil-laminated polyester film conductive support was provided a 0.05 μm-thick interlayer comprised of a vinyl chloride-vinyl acetate-maleic anhydride copolymer "Eslec MF-10" (a product of Sekisui Chemical Co., Ltd.), and then on this was coated a dispersion liquid of 5 g of Exemplified Compound A-16 and 3.3 g of a polycarbonate resin "Panlite L-1250" (a product of Teijin Chemical Industry Co., Ltd.) added to and dispersed for 24 hours by means of a ball mill into 100 ml of dichloromethane to form a layer so that the dry thickness is 10 μm, whereby a photoreceptor was prepared.

The thus obtained photoreceptor sample was tested and measured in the same manner as in Example 1 with The above-obtained photoreceptor was tested and measured in the same manner as in Example 1 except that the charging voltage was changed to +6 kv, and the first results were $E_{\frac{1}{2}}=3.1$ lux.sec and $V_R=+5v$.

Example 12

An ethylenediamine 2% Exemplified Compound A-7 solution was coated on an aluminum-laminated polyester film so that the dry thickness is 0.5 μm, whereby a carrier-generating layer was formed. Further on this was coated and dried each solution separately prepared by dissolving about 10 g each of the foregoing compound T-11, the foregoing compound T-43 and the foregoing compound T-184 and 14 g of a polycarbonate resin "Panlite L-1250" (a product of Teijin Chemical Industry Co., Ltd.) to form a layer so that the dry thickness is 12 μm, whereby three photoreceptors different in the carrier-transport material were obtained.

These three photoreceptors each was evaluated with respect to the following characteristics with use of an electronic paper tester Model SP-428, manufactured by Kawaguchi Denki Seisakusho K.K. Each photoreceptor was charged for 5 seconds at a charging voltage of −6 kv, then allowed to stand for 5 seconds in the dark, and then exposed to a halogen lamp light so that the illuminance on the photosensitive surface of the sample is 35 luxes, whereby the exposure (half-exposure E ½) that is required to reduce the surface potential by half was measured. In addition, the surface potential (residual potential) $V_R$ after being subjected to a 30-lux.sec exposure also was measured. The results were good in combination with any of the carrier-transport materials as indicated in Table 5.

TABLE 5

| Carrier-transport material with Exemplified Compound A-7 | E ½ (lux.sec) | $V_R$ (V) |
| --- | --- | --- |
| T-11 | 3.2 | 0 |
| T-43 | 2.5 | 0 |
| T-184 | 2.6 | 0 |

Comparative Example 4

A comparative photoreceptor sample was prepared in the same manner as in Example 11 except that the Exemplified Compound A-101 used in Example 11 was replaced by the following bisazo compound C-(4), and then the characteristics of the sample were evaluated.

C-(4)

As is indicated in Table 6, the results largely differ between the carrier-transport materials.

TABLE 6

| Carrier transport material with compound C-(4) | E ½ (lux.sec) | $V_R$ (V) |
| --- | --- | --- |
| T-11 | 10.3 | 40 |
| T-43 | 9.1 | 25 |
| T-184 | 5.5 | 10 |

Example 13

A drum-form photoreceptor was prepared in the same manner as in Example 5 except that the Exemplified Compound A-5 used in Example 5 was replaced by Excemplified Compound A-194. The spectral sensitivity of this photoreceptor at 790 nm was 820 volt.cm$^2$.μW$^{-1}$.sec$^{-1}$ (light attenuation rate). The field copying test of the photoreceptor was performed using an experimental machine equipped with a semiconductor laser (790 nm) unit whose laser light intensity on the surface of the photoreceptor is 0.85 mW.

The surface of the photorecetor was charged at −6 kv, then exposed to the laser light, and then subjected to reversal development under the condition of a bias voltage of −250 V, and as a result of fog-free, satisfactory image was obtained.

Comparative Example 5

A comparative photoreceptor sample was prepared in the same manner as in Example 13 except that the Exemplified Compound A-194 used in Example 15 was replaced by the following comparative bisazo compound C-(5).

C-(5)

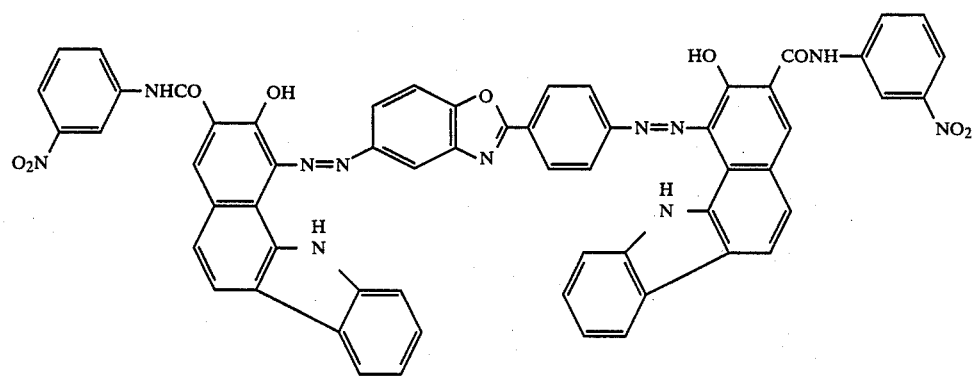

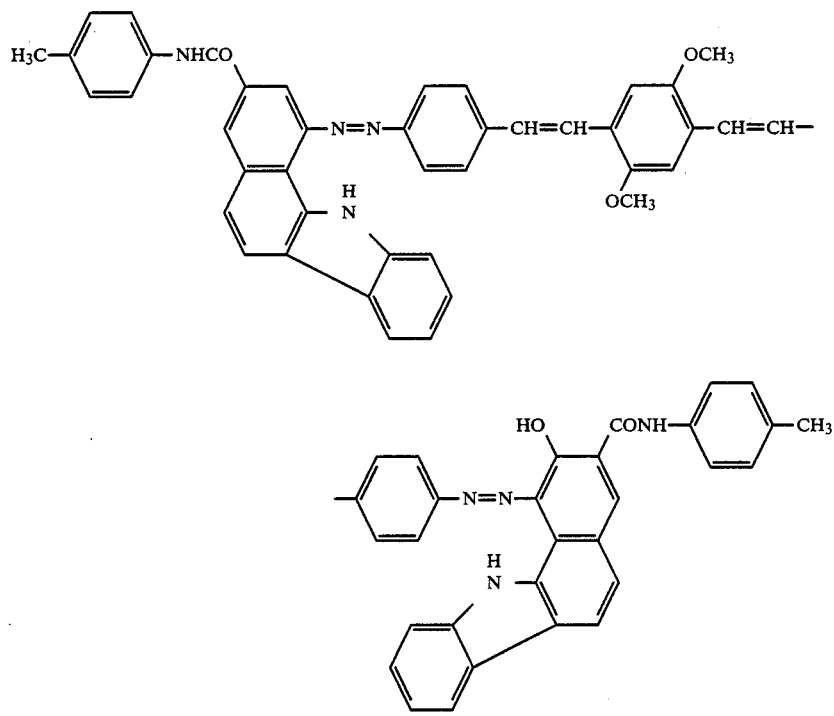

The spectral sensitivity of this photoreceptor at 790 nm was 500 volt.cm$^2$.μW$^{-1}$.sec$^{-1}$ (light attenuation rate). This comparative photoreceptor was used to perform a field copying test with the semiconductor laser in like manner, but much fog appeared on the resulting image. Thus, no satisfactory image copies were obtained.

As is apparent from the results from the above examples and comparative examples, the photoreceptors of this invention are remarkably excellent in the characteristics such as the stability, sensitivity, durability, permissibility of any combination with diverse carrier-transport materials, and the like, as compared to the comparative photoreceptors.

Examples 14 through 27

Drum-form photoreceptor samples were prepared in the same manner as in Example 5 except that the compound T-109 (charge-transport material) was replaced as shown in Table 7. The spectral sensitivities of these photoreceptor samples at 790 nm are as given in Table 7. As a result of the field copying tests in these examples 14–27, which were made in the same manner as in Example 13, fog-free, satisfactory image copies were obtained.

TABLE 7

| Example No. | Charge-generating material | Charge-transport material | Spectral sensitivity (volt · cm$^2$ · μW$^{-1}$ · sec$^{-1}$) |
|---|---|---|---|
| Example 14 | Exemplified compound A-224 | Compound T-187 | 850 |
| Example 15 | Exemplified compound A-198 | Compound T-196 | 910 |
| Example 16 | Exemplified compound A-222 | Compound T-126 | 900 |

TABLE 7-continued

| Example No. | Charge-generating material | Charge-transport material | Spectral sensitivity (volt · cm$^2$ · μW$^{-1}$ · sec$^{-1}$) |
|---|---|---|---|
| Example 17 | Exemplified compound A-219 | Compound T-132 | 880 |
| Example 18 | Exemplified compound A-199 | Compound T-110 | 900 |
| Example 19 | Exemplified compound A-115 | Compound T-122 | 850 |
| Example 20 | Exemplified compound A-100 | Compound T-46 | 740 |
| Example 21 | Exemplified compound A-147 | Compound T-53 | 690 |
| Example 22 | Exemplified compound A-128 | Compound T-155 | 860 |
| Example 23 | Exemplified compound A-116 | Compound T-167 | 830 |
| Example 24 | Exemplified compound A-119 | Compound T-19 | 700 |
| Example 25 | Exemplified compound A-234 | Compound T-244 | 690 |
| Example 26 | Exemplified compound A-118 | Compound T-197 | 720 |
| Example 27 | Exemplified compound A-235 | Compound T-192 | 740 |

What is claimed is:

1. A photoreceptor which have a photosensitive layer containing an azo compound represented by the following Formula [I], Formula [I]

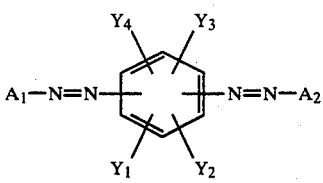

wherein $Y_1$, $Y_2$, $Y_3$ and $Y_4$ each is a hydrogen atom, an alkyl group, an alkoxy group or a halogen atom; $A_1$ and $A_2$ each represents

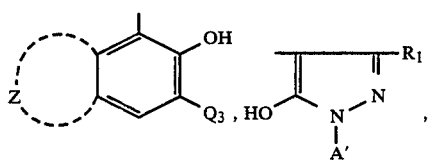

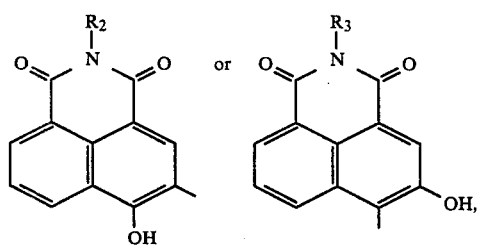

wherein Z is a group of atoms necessary to complete a substituted or unsubstituted aromatic carbocyclic ring or a substituted or unsubstituted aromatic heterocyclic ring; $Q_3$ is a substituted or unsubstituted carbamoyl group or a substituted or unsubstituted sulfamoyl group; $R_1$ is a hydrogen atom, a substituted or unsubstituted alkyl group, a substituted or unsubstituted amino group, a substituted or unsubstituted carbamoyl group, a carboxyl group or ester group thereof, or a cyano group; $A'$ is a substituted or unsubstituted aryl group; and $R_2$ and $R_3$ each is a substituted or unsubstituted alkyl group, a substituted or unsubstituted aralkyl group, or a substituted or unsubstituted aryl group.

2. The photoreceptor of claim 1, wherein said photosensitive layer contains a carrier-generating material and a carrier-transport material, and said carrier-generating material is said azo compound.

3. The photoreceptor of claim 2, wherein said photosensitive layer consists of a carrier-generating layer containing said carrier-generating material and a carrier-transport layer containing said carrier-transport material.

4. The photoreceptor of claim 1, wherein said azo compound is represented by the following Formula [II], Formula [II]

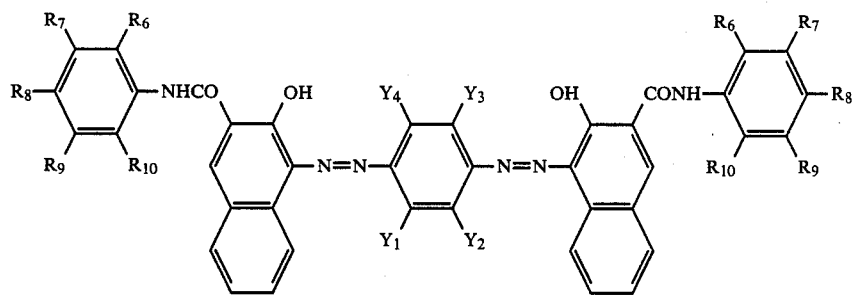

wherein $Y_1$, $Y_2$, $Y_3$ and $Y_4$ are the same as those of claim 1, $R_6$, $R_7$, $R_8$, $R_9$ and $R_{10}$ are a hydrogen atom, a halogen atom, an aryl group, an alkyl group or an alkoxy group, independently.

5. The photoreceptor of claim 1, wherein said azo compound is represented by the following Formula [III], Formula [III]

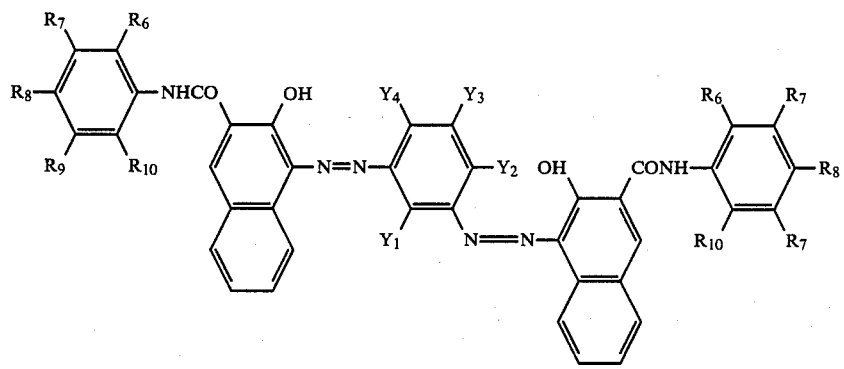

wherein $Y_1$, $Y_2$, $Y_3$ and $Y_4$ are the same as those of claim 1, and $R_6$, $R_7$, $R_8$, $R_9$ and $R_{10}$ are a hydrogen atom, a halogen atom, an aryl group, an alkyl group or an alkoxy group, independently.

6. The photoreceptor of claim 1, wherein said azo compound is represented by the following Formula [IV], Formula [IV]

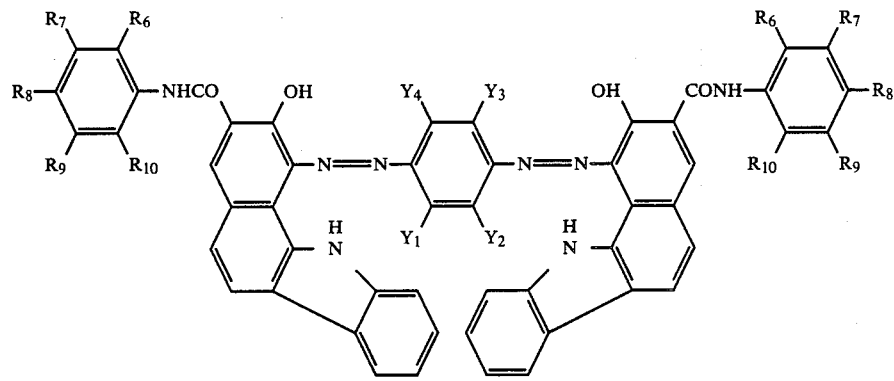

wherein $Y_1$, $Y_2$, $Y_3$ and $Y_4$ are the same as those of claim 1, and $R_6$, $R_7$, $R_8$, $R_9$ and $R_{10}$ are a hydrogen atom, a halogen atom, an aryl group, an alkyl group or an alkoxy group, independently.

7. The photoreceptor of claim 1, wherein said azo compound is represented by the following Formula [V], Formula [V]

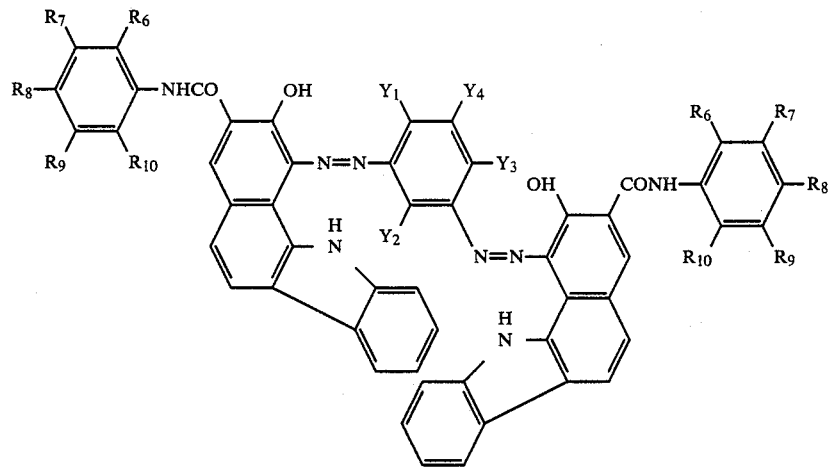

wherein $Y_1$, $Y_2$, $Y_3$ and $Y_4$ are the same as those of claim 1, and $R_6$, $R_7$, $R_8$, $R_9$ and $R_{10}$ are a hydrogen atom, a halogen atom, an aryl group, an alkyl group or an alkoxy group, independently.

8. The photoreceptor of claim 1, wherein said azo compound is represented by the following Formula [VI], Formula [VI]

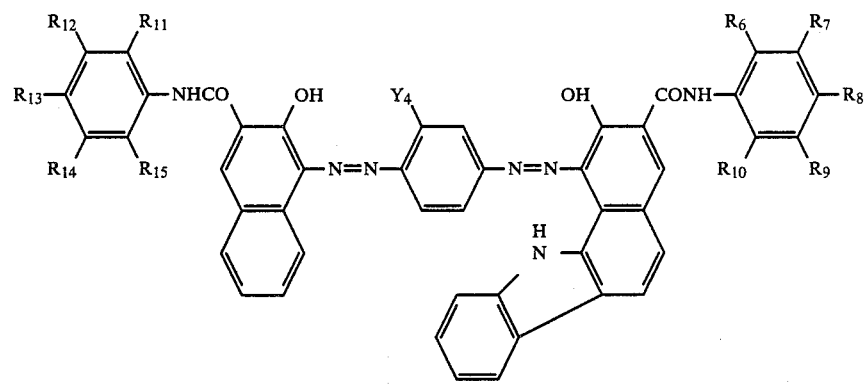

wherein $Y_4$ is the same as that of claim 1, $R_6$, $R_7$, $R_8$, $R_9$ and $R_{10}$ are a hydrogen atom, a halogen atom, an aryl group, an alkyl group or an alkoxy group, independently; and $R_{11}$, $R_{12}$, $R_{13}$, $R_{14}$ and $R_{15}$ are a hydrogen atom, a halogen atom, an alkyl group or an alkoxy group, independently.

9. The photoreceptor of claim 1, wherein said azo compound is represented by the following Formula [VII], Formula [VII]

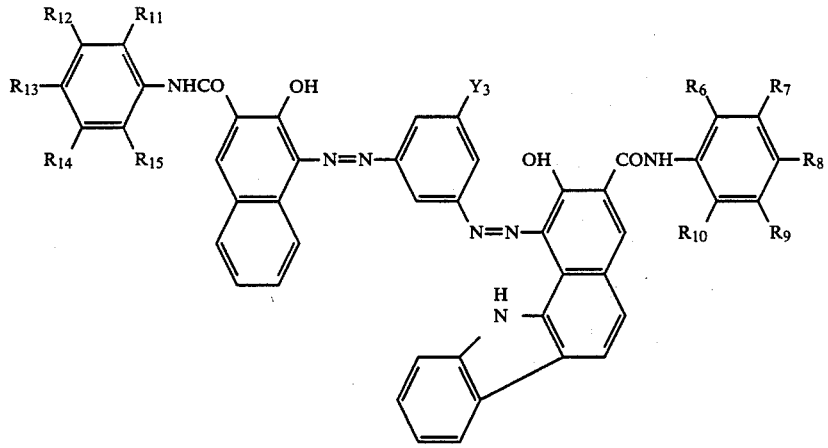

wherein Y is the same as that of claim 1, $R_6$, $R_7$, $R_8$, $R_9$ and $R_{10}$ are a hydrogen atom, a halogen atom, an aryl group, an alkyl group or an alkoxy group, independently; and $R_{11}$, $R_{12}$, $R_{13}$, $R_{14}$ and $R_{15}$ are a hydrogen atom, a halogen atom, an alkyl group or an alkoxy group, independently.

10. The photoreceptor of claim 2, wherein said carrier-transport material is selected from the group consisting of trinitrofluorenone, tetranitrofluorenone, polymers having in the side chain thereof heterocyclic compounds typified by poly-N-vinylcarbazole, triazole derivatives, oxadiazole derivatives, imidazole derivatives, pyrazoline derivatives, polyarylalcane derivatives, phenylendiamine derivatives, hydrazone derivatives, amino-substituted chalcone derivatives, triarylamine derivatives, carbazole derivatives, stilbene derivatives, and phenothiazine derivatives.

11. The photoreceptor of claim 10, wherein said carrier-transport material is represented by the following Formula [VIII], Formula [VIII]

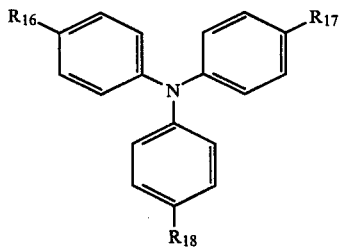

wherein $R_{16}$, $R_{17}$ and $R_{18}$ each is a hydrogen atom, an alkyl group, an alkoxy group, a halogen atom, a hydroxy group, a cyano group, a dialkylamino group, a diarylamino group, a diaralkylamino group, or a nitro group.

12. The photoreceptor of claim 10, wherein said carrier-transport material is represented by the following Formula [IX], Formula IX]

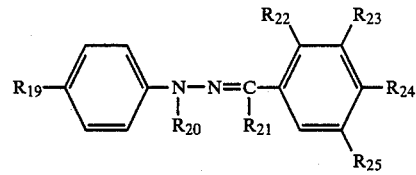

wherein $R_{19}$, $R_{22}$, $R_{23}$, $R_{24}$ and $R_{25}$ each is a hydrogen atom, an alkyl group, an alkoxy group, a halogen atom, a hydroxy group, a cyano group, a dialkylamino group, a diarylamino group, a diaralkylamino group or a nitro group; $R_{20}$ is an alkyl group, a substitutable phenyl group, a substitutable benzyl group, or a substitutable naphthyl group; and $R_{21}$ is a hydrogen atom, an alkyl group, a cyano group or a substitutable phenyl group.

13. The photoreceptor of claim 10, wherein said carrier-transport material is represented by the following Formula [X], Formula [X]

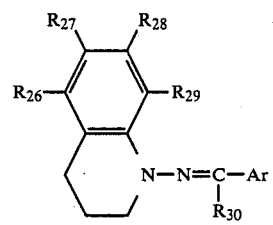

wherein $R_{26}$, $R_{27}$, $R_{28}$ and $R_{29}$ is a hydrogen atom, an alkyl group, an alkoxy group, a halogen atom, a hydroxy group, a cyano group, a dialkylamino group, a diarylamino group, a diaralkylamino group or a nitro group; $R_{30}$ is a hydrogen atom, a substitutable phenyl group, a cyano group or an alkyl group; Ar is

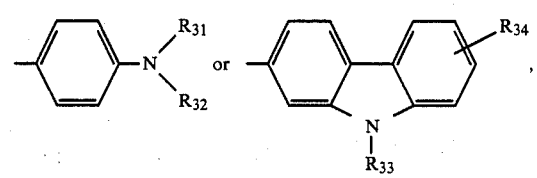

wherein $R_{31}$, $R_{32}$ and $R_{33}$ each is an alkyl group, a substitutable benzyl group, a substitutable phenyl group or a substitutable naphthyl group; and $R_{34}$ is a hydrogen atom, an alkyl group, an alkoxy group, a halogen atom, a hydroxy group, a cyano group, a dialkylamino group, a diarylamino group, diaralkylamino group, or a nitro group.

14. The photoreceptor of claim 10, wherein said carrier-transport material is represented by the following Formula [XI], Formula [XI]

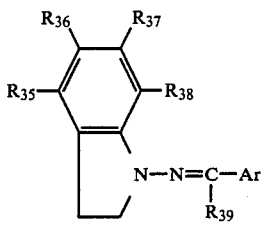

wherein $R_{35}$, $R_{36}$, $R_{37}$ and $R_{38}$ each is a hydrogen atom, an alkyl group, an alkoxy group, a halogen atom, a hydroxy group, a cyano group, a dialkylamino group, a diarylamino group, a diaralkylamino group, or a nitro group; $R_{39}$ is a hydrogen atom, a substitutable phenyl group, a cyano group, or an alkyl group; Ar is

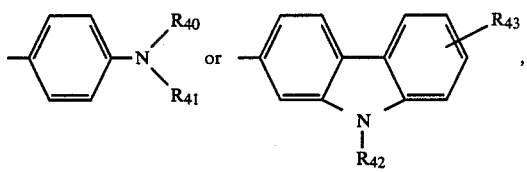

wherein $R_{40}$, $R_{41}$ and $R_{42}$ each is an alkyl group, a substitutable benzyl group, a substitutable phenyl group, or a substitutable naphthyl group; and $R_{43}$ is a hydrogen atom, an alkyl group, an alkoxy group, a halogen atom, a hydroxy group, a cyano group, a dialkylamino group, a diarylamino group, a diaralkylamino group, or a nitro group.

15. The photoreceptor of claim 10, wherein said carrier-transport material is represented by the following Formula [XII], Formula [XII]

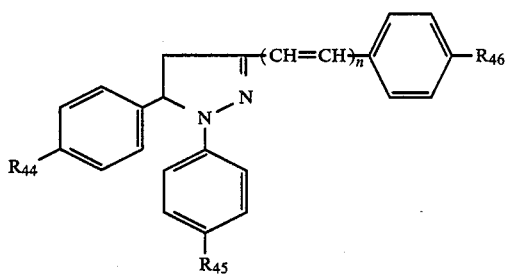

wherein $R_{44}$, $R_{45}$ and $R_{46}$ each is a hydrogen atom, an alkyl group, an alkoxy group, a halogen atom, a hydroxy group, a cyano group, a dialkylamino group, a diarylamino group, a diaralkylamino group, or a nitro group; and n is an integer of zero or 1.

16. The photoreceptor of claim 10, wherein said carrier-transport material is represented by the following Formula [XIII], Formula [XIII]

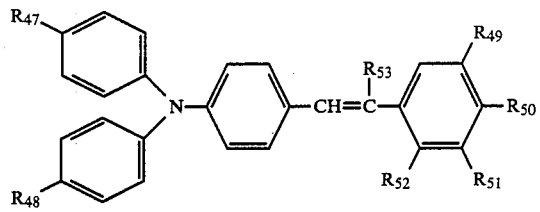

wherein $R_{47}$, $R_{48}$, $R_{49}$, $R_{50}$, $R_{51}$ and $R_{52}$ each is a hydrogen atom, an alkyl group, an alkoxy group, a halogen atom, a hydroxy group, a cyano group, a dialkylamino group, a diarylamino group, a diaralkylamino group, or a nitro group; and $R_7$ is a hydrogen atom or a phenyl group.

17. The photoreceptor of claim 10, wherein said carrier-transport material is represented by the following Formula [XIV], Formula [XIV]

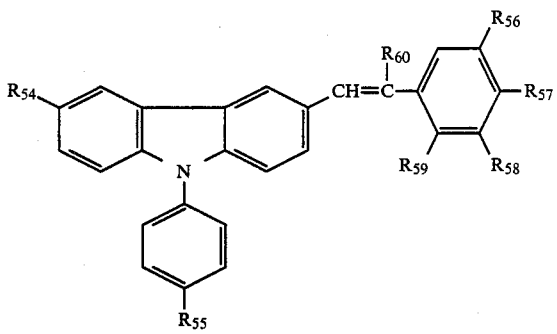

wherein $R_{54}$, $R_{55}$, $R_{56}$, $R_{57}$, $R_{58}$ and $R_{59}$ each is a hydrogen atom, an alkyl group, an alkoxy group, a halogen atom, a hydroxy group, a cyano group, a dialkylamino group, a diarylamino group, a diaralkylamino group, or a nitro group; and $R_{60}$ is a hydrogen atom or a phenyl group.

18. The photoreceptor of claim 10, wherein said carrier-transport material is represented by the following Formula [XV], Formula [XV]

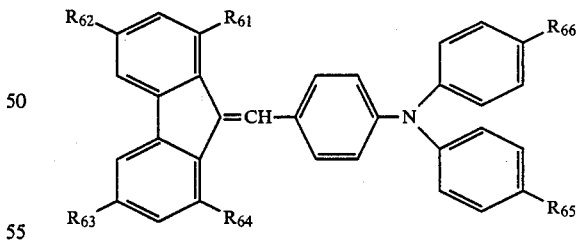

wherein $R_{61}$, $R_{62}$, $R_{63}$, $R_{64}$, $R_{65}$ and $R_{66}$ each is a hydrogen atom, an alkyl group, an alkoxy group, a halogen atom, a hydroxy group, a cyano group, dialkylamino group, diarylamino group, a diaralkylamino group, or a nitro group.

19. The photoreceptor of claim 3, wherein said carrier-generating layer has the thickness in the range of from 0.01 μm to 5 μm.

20. The photoreceptor of claim 2, wherein said photosensitive layer is a single layer which contains said carrier-transport material and said carrier-generating material each dispersed therein.

* * * * *